United States Patent
Futsuhara

[19]

[11] Patent Number: 5,861,813
[45] Date of Patent: Jan. 19, 1999

[54] SAFETY SECURING DEVICE

[75] Inventor: Koichi Futsuhara, Urawa, Japan

[73] Assignee: The Nippon Signal, Co., Ltd., Tokyo, Japan

[21] Appl. No.: 718,474

[22] PCT Filed: Feb. 20, 1995

[86] PCT No.: PCT/JP95/00243

§ 371 Date: Oct. 7, 1996

§ 102(e) Date: Oct. 7, 1996

[87] PCT Pub. No.: WO96/24463

PCT Pub. Date: Aug. 15, 1996

[30] Foreign Application Priority Data

Feb. 7, 1995 [JP] Japan .................................. 7-00165

[51] Int. Cl.⁶ .................................................. G08B 21/00
[52] U.S. Cl. ....................... 340/648; 340/635; 340/679; 318/450
[58] Field of Search .................................. 340/539, 441, 340/635, 644, 466, 648, 670, 679; 49/31, 279, 280, 302; 123/198 D; 318/450, 558

[56] References Cited

U.S. PATENT DOCUMENTS

| | | | |
|---|---|---|---|
| 4,017,044 | 4/1977 | Anderson et al. .................. | 246/182 B |
| 4,275,342 | 6/1981 | Kawada et al. ......................... | 340/648 |
| 4,546,845 | 10/1985 | Meyer et al. ............................... | 49/31 |
| 4,661,880 | 4/1987 | Futsuhara .................................. | 361/93 |
| 5,048,503 | 9/1991 | Suzuki et al. ......................... | 123/198 D |
| 5,218,282 | 6/1993 | Duhame ................................... | 318/603 |
| 5,345,138 | 9/1994 | Mukaidono et al. .................... | 307/326 |
| 5,568,131 | 10/1996 | Sakai et al. ............................... | 340/648 |
| 5,619,110 | 4/1997 | Sugimoto et al. ....................... | 318/450 |

FOREIGN PATENT DOCUMENTS

WO 9429638  12/1994  WIPO ................................... 318/450

*Primary Examiner*—Jeffery A. Hofsass
*Assistant Examiner*—Van T. Trieu
*Attorney, Agent, or Firm*—Oblon, Spivak, McClelland, Maier & Neustadt, P.C.

[57] ABSTRACT

A rotation detecting means detects rotation of a mechanical movable portion and outputs a detection signal corresponding to the rotation rate of the mechanical movable portion. A rotation monitoring circuit, to which the detection signal from the rotation detecting means is provided, outputs a rotation-existing signal when the detection signal indicates that the mechanical movable portion is rotating. A rotation stop monitoring circuit, to which the detection signal from the rotation detecting means is provided, outputs a rotation-stop signal when the detection signal indicates a rotation rate lower than a predetermined rotation rate, and a movable portion control circuit uses at least either the rotation-existing signal or the rotation-stop signal and an external command signal for input signals to control the mechanical movable portion with logic of these signals. An apparatus for assuring safety by using the rotation-stop signal and rotation-existing signal as signals for securing safety of the operator against the mechanical movable portion is achieved.

5 Claims, 18 Drawing Sheets

SAFETY SECURING DEVICE

TECHNICAL FIELD

The present invention relates to a safety securing device that allows an operator to approach a mechanical movable portion after the mechanical movable portion, which is driven by a motor M or the like, has stopped rotating or moving. The safety securing device according to the present invention is particularly suited for constituting a guard system in which the mechanical movable portion is surrounded by a fence with a door provided with a locking device at a portion of the fence such that, when the locking device of the door is released, the mechanical movable portion within the fence can be approached.

BACKGROUND ART

A safety securing device of this type is disclosed in PCT/JP93/00758. Also, a sensor for verifying that the rotation or movement of a mechanical movable portion has stopped is disclosed in International Publication WO94/23303. In addition, a device for detecting that rotation is at a specific rate or lower is also required in an apparatus that includes a mechanical movable portion driven by a motor M or the like, i.e., a robot or the like, as a safety device that allows the operator to approach the apparatus only after the mechanical movable portion has completely stopped its operation, in order to assure the safety of the operator who must approach the apparatus. Such safety devices include the motor rotation stop detecting device disclosed in International Publication WO94/23303, which is capable of reliably detecting that the rotation of a motor M has stopped, including rotation under inertia, and operates toward safety when the apparatus has had a failure, thereby providing a high degree of safety. However, the device disclosed in this prior art publication has two problems yet to be solved, i.e., a delay in issuing notification of the stop that occurs because the device is not provided with a function for detecting the rotation rate and, since a bridge circuit is employed for a rotation sensor, adjustment of the bridge circuit is required.

These problems are eliminated in PCT/JP95/00165 for which an application was submitted by the applicant. However, PCT/JP95/00165 only discloses the technology for issuing notification of mechanical movable portion stop, and the disclosure does not encompass the use of the mechanical movable portion stop signal as a signal for assuring safety of an operator against the mechanical movable portion.

DISCLOSURE OF THE INVENTION

Accordingly, it is an object of the present invention to provide a safety securing device that assures the safety of an operator by using a mechanical movable portion stop signal and a mechanical movable portion rotation signal as signals for assuring the safety of the operator against the mechanical movable portion.

It is a further object of the present invention to provide a safety securing device that assures the safety of the operator by using a mechanical movable portion stop signal and a mechanical movable portion rotation signal as signals for assuring the safety of the operator against the mechanical movable portion when constituting a guard system in which the mechanical movable portion is enclosed by a fence such that, at a portion thereof, a door having a locking device is provided and the mechanical movable portion within the fence can be approached when the locking device of the door is released.

The operation of the mechanical movable portion may include two modes, i.e., rotatory and linear movement. In this specification, in order to simplify the explanation, it is assumed that the operation is rotatory, and that the explanation includes linear movement.

In order to achieve the objects described above, the safety securing device according to the present invention includes a rotation detecting means, a rotation monitoring circuit, a rotation stop monitoring circuit and a movable portion control circuit.

The rotation detecting means detects rotation of the mechanical movable portion and outputs a detection signal that corresponds to the rotation rate. The rotation monitoring circuit, to which the detection signal from the rotation detecting means is provided, outputs a rotation-existing signal when the detection signal indicates that the mechanical movable portion is rotating. The rotation stop monitoring circuit, to which the detection signal from the rotation detecting means is provided outputs a rotation-stop signal when the detection signal indicates a rotation rate that is lower than a predetermined rotation rate. The movable portion control circuit, which uses at least either the rotation-existing signal or the rotation-stop signal and an external command signal as its input signals, controls the mechanical movable portion with its logic.

In a desirable example, the mechanical movable portion is enclosed by a fence with a door provided at a portion of the fence. The door is provided with a locking device that is not released while the mechanical movable portion is rotating and may be released when it is indicated that the rotation rate of the mechanical movable portion is lower than the rotation rate that has been predetermined in the rotation stop monitoring circuit.

In one mode that can be constituted in the structure described above, the movable portion control circuit starts up the mechanical movable portion at a rotation rate lower than the rotation rate that has been predetermined at the rotation stop monitoring circuit and is also within a range that allows the rotation-existing signal to be output from the rotation monitoring circuit when the operation of the mechanical movable portion starts, and continues the operation of the mechanical movable portion with a rotation-existing signal output from the rotation monitoring circuit after startup.

In another mode, the mechanical movable portion control signal performs OR calculation for the rotation-existing signal output from the rotation monitoring circuit and an output signal from a startup switch for starting up the mechanical movable portion and uses an AND output signal constituted of the OR output signal and an ON signal output from the door switch when the door is closed as a signal for driving the mechanical movable portion.

In yet another mode, the movable portion control circuit includes an operating switch, an on-delay timer, a self holding circuit and a means for switching. The operating switch is provided with at least a first contact point and a second contact point. The first contact point and second contact point maintain a relationship in which when one is closed the other is open.

The first contact point is connected in series with a motor M and the second contact point is connected in series with the on-delay timer. The on-delay timer is provided with a contact point. The self holding circuit is provided with an OR signal constituted of an ON signal at the contact point of the on-delay timer and the rotation-existing signal to be used as a trigger signal and is also provided with the rotation-stop signal from the rotation stop monitoring circuit to be used as a reset signal. The means for switching sends a signal for releasing the lock to the locking device when it receives the output from the self holding circuit.

In yet another mode, the movable portion control circuit includes an operating switch, a door switch and a means for switching. The operating switch outputs either a mechanical movable portion POWER ON signal or a mechanical movable portion POWER OFF signal. The door switch outputs an ON signal that indicates that the door is open. The self holding circuit uses an OR signal constituted of an AND signal which is, in turn, constituted of the mechanical movable portion POWER OFF signal from the operating switch and the ON signal from the door switch and the rotation-existing signal as a trigger input signal, and uses the LOCK signal for the locking device as a reset input signal to provide the locking device with a LOCK signal.

BRIEF DESCRIPTION OF THE DRAWINGS

Other advantages, features and objects of the present invention are explained in further detail in reference to the attached drawings.

BEST MODE FOR CARRYING OUT THE INVENTION

Figure 1:
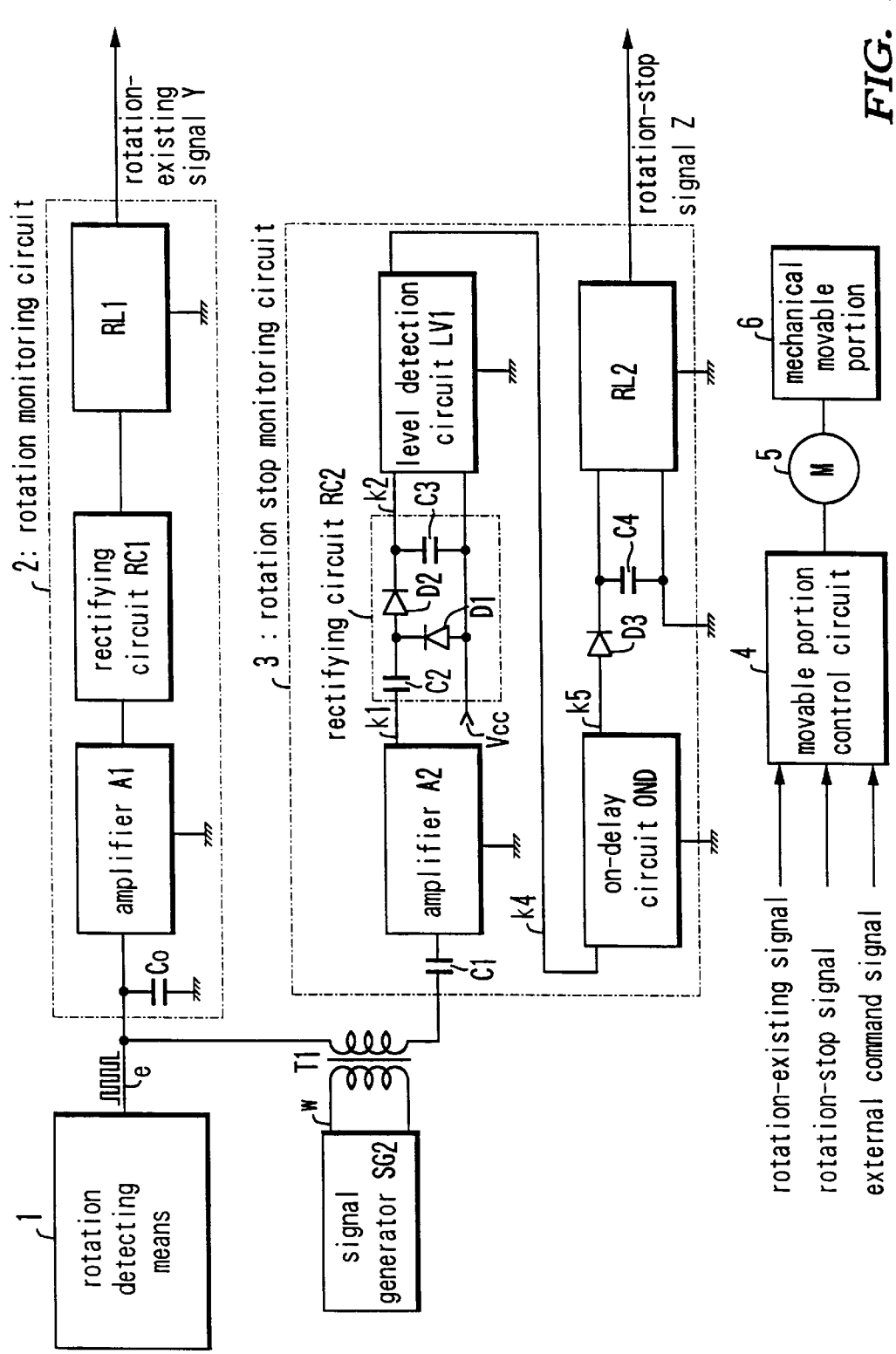
FIG. 1 is a block diagram of the safety securing device according to the present invention.

The safety securing device according to the present invention shown in FIG. 1 is provided with a rotation detecting means 1, a rotation monitoring circuit 2, a rotation stop monitoring circuit 3 and a movable portion control circuit 4. Reference number 5 indicates a power supply that includes, for instance, a motor M and the like, and reference number 6 indicates a mechanical movable portion.

The rotation detecting means 1 detects rotation of the mechanical movable portion and outputs a detection signal constituted of an AC signal. The rotation detecting means 1 will, under normal circumstances, include a sensor for detecting rotation of the mechanical movable portion and a circuit that processes sensor output signals. Such a rotation detecting means 1 is disclosed in International Publication WO 94/23303 mentioned earlier.

Figure 2:
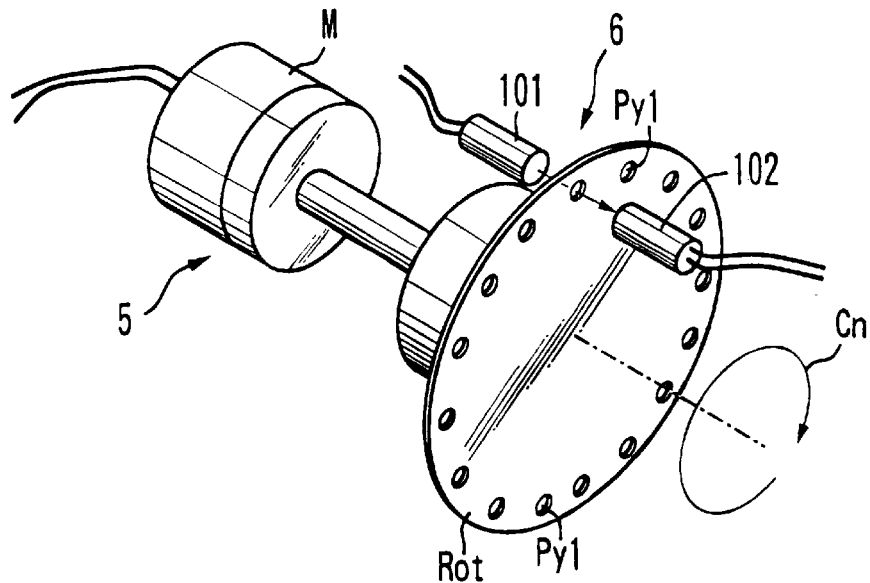
FIG. 2 is a perspective of a rotation sensor employed in the means for rotation detection.

FIG. 2 is a perspective of the sensor which is employed in the rotation detecting means disclosed in the publication mentioned above and FIG. 3 is a partial cross section of the same sensor. The mechanical movable portion Rot is included in the mechanical movable portion 6 and is rotated in the direction indicated with the arrow Cn by the power supply 5 constituted of the motor M and the like. The mechanical movable portion Rot is provided with through holes Py provided on the same circumference with an appropriate pitch. On opposite sides of the mechanical movable portion Rot, a transmitting element 101 and a receiving element 102 are provided facing each other. The transmitting element 101 may be, for instance, a light emitting element and the receiving element 102 may be a light receiving element. When the mechanical movable portion Rot is rotating, every time a through hole Py of the mechanical movable portion Rot is located between the transmitting element 101 and the receiving element 102, the signal transmitted from the transmitting element 101 is received by the receiving element 102. When a portion of the mechanical movable portion Rot where no through hole Py is provided is located between the transmitting element 101 and the receiving element 102, a signal transmitted from the transmitting element 101 is blocked by the mechanical movable portion Rot and, as a result, the signal transmitted by the transmitting element 101 is not received by the receiving element 102. Consequently, when the moving body Rot is rotating, an AC signal is output from the receiving element 102. A sensor circuit included in the rotation detecting means 1 amplifies the AC signal sent from the receiving element 102 to output an amplified AC signal e.

Figure 3:
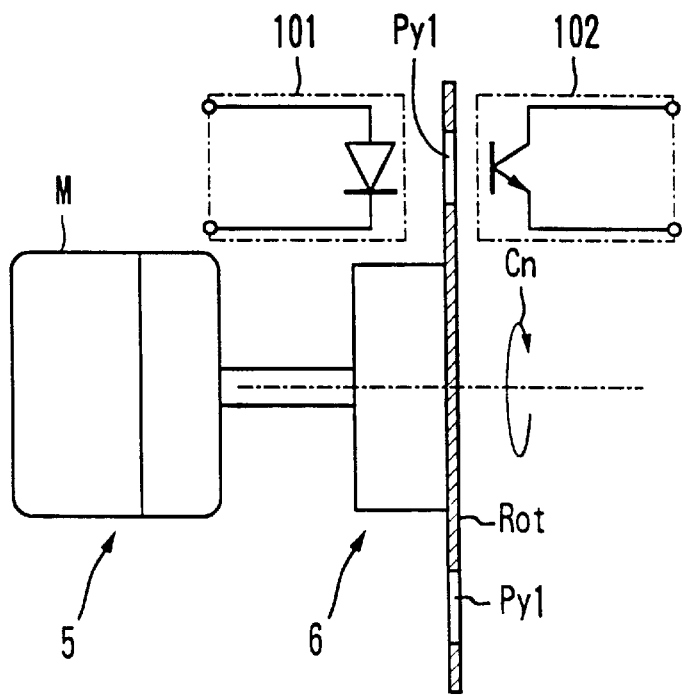
FIG. 3 is a partial cross section of the rotation sensor shown in FIG. 2.
Figure 4:
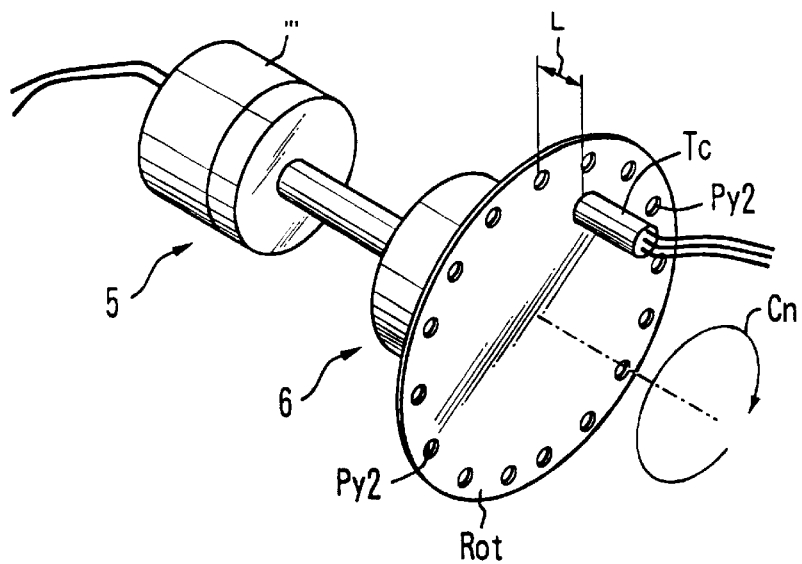
FIG. 4 is a perspective of another rotation sensor employed in the rotation detecting means.
Figure 5:
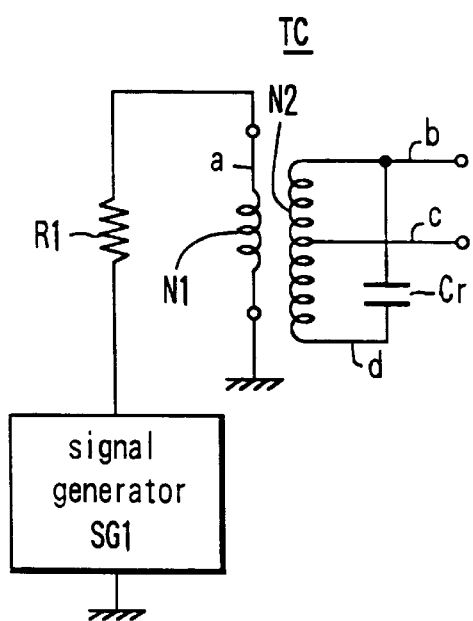
FIG. 5 is a circuit diagram of the rotation sensor shown in FIG. 4.

The sensor that is included in the rotation detecting means 1 is not limited to that shown in FIGS. 2 and 3. Basically, the only requirement imposed on the sensor is that it be capable of outputting an AC signal in response to the rotation of the mechanical movable portion Rot. Such an example is shown in FIGS. 4 and 5. The sensor shown in FIGS. 4 and 5 is disclosed in PCT/JP95/00165. This sensor includes a coil TC, which is provided in close proximity to a surface of the mechanical movable portion Rot over a distance L. The coil TC is driven by a signal generator SG1. An AC signal output from the signal generator SG1 is provided to a first winding N1 of the coil TC via a current limiting resistor R1. The coil TC also includes a second winding N2 and outputs an AC signal that is induced by the second winding N2. The coil TC is provided with a resonance capacitor Cr, which resonates at the operating frequency of the AC signal provided by the signal generator SG1.

The rotation detecting means 1 detects changes in impedance at the coil TC which occur in correspondence to the indentations or non-through holes Py2 (hereafter referred to as indentations Py2) provided in the surface of the mechanical movable portion Rot, and outputs a detection signal thereof. A change in impedance at the coil TC depending upon the presence or absence of an indentation Py2 at the mechanical movable portion Rot is detected by the sensor circuit included in the rotation detecting means 1 and the sensor circuit outputs the AC signal e. When the coil TC is used, the mechanical movable portion Rot should be constituted of a metal material. Note that the structure of the coil TC does not necessarily have to be limited to that shown in the figures. For instance, the coil TC may be provided with only one winding. Apart from this, various coil structures for electromagnetic induction sensors may be adopted.

The rotation monitoring circuit 2 includes an AC amplifier A1, a rectifying circuit RC1 and an electromagnetic relay RL1. The AC amplifier A1 amplifies the AC signal e output from the rotation detecting means 1. The rectifying circuit RC1 rectifies the AC amplified signal provided by the AC amplifier A1. The rectifying circuit RC1 is capable of satisfactory response even when the signal obtained as the mechanical movable portion Rot rotates has become a low-frequency signal.

When the mechanical movable portion Rot is rotating, the AC signal e is output from the rotation detecting means 1. This AC signal e is amplified at the AC amplifier A1 and the AC signal thus amplified is then rectified at the rectifying circuit RC1. The electromagnetic relay RL1 is excited by the rectified output provided by the rectifying circuit RC1 and then its contact point is closed. The ON state of the contact point corresponds to a rotation-existing signal Y.

When the mechanical movable portion Rot stops rotating, the AC signal e is no longer output from the rotation detecting means 1. This sets the electromagnetic relay RL1 in an unexcited state to set its contact point to open. The open state of the contact point corresponds to a rotation-stop signal.

The rotation stop monitoring circuit 3, which is provided with the AC signal e by the rotation detecting means 1, outputs a rotation-stop signal Z. A signal generator SG2 and a transformer T1 are provided on the line that extends from the rotation detecting means 1 through the rotation stop monitoring circuit 3. The signal generator SG2 provides a current signal w whose frequency is higher than that of the AC signal e output from the rotation detecting means 1 to the rotation stop monitoring circuit 3 via the transformer T1. This signal w has a smaller amplitude than that of the rotation signal e, which is generated as the mechanical movable portion Rot rotates. A capacitor C0, which is connected to the input of the rotation monitoring circuit 2, is provided in order to prevent this high frequency signal w from being communicated to the rotation monitoring circuit 2. It is desirable to constitute the capacitor C0 with a 4-terminal capacitor in order to avoid loss of function caused by a disconnection failure at its lead wire.

The rotation stop monitoring circuit 3 includes the signal generator SG2, an AC amplifier A2, a rectifying circuit RC2, a level detection circuit LV1, an on-delay circuit OND and an electromagnetic relay RL2.

Figure 6:
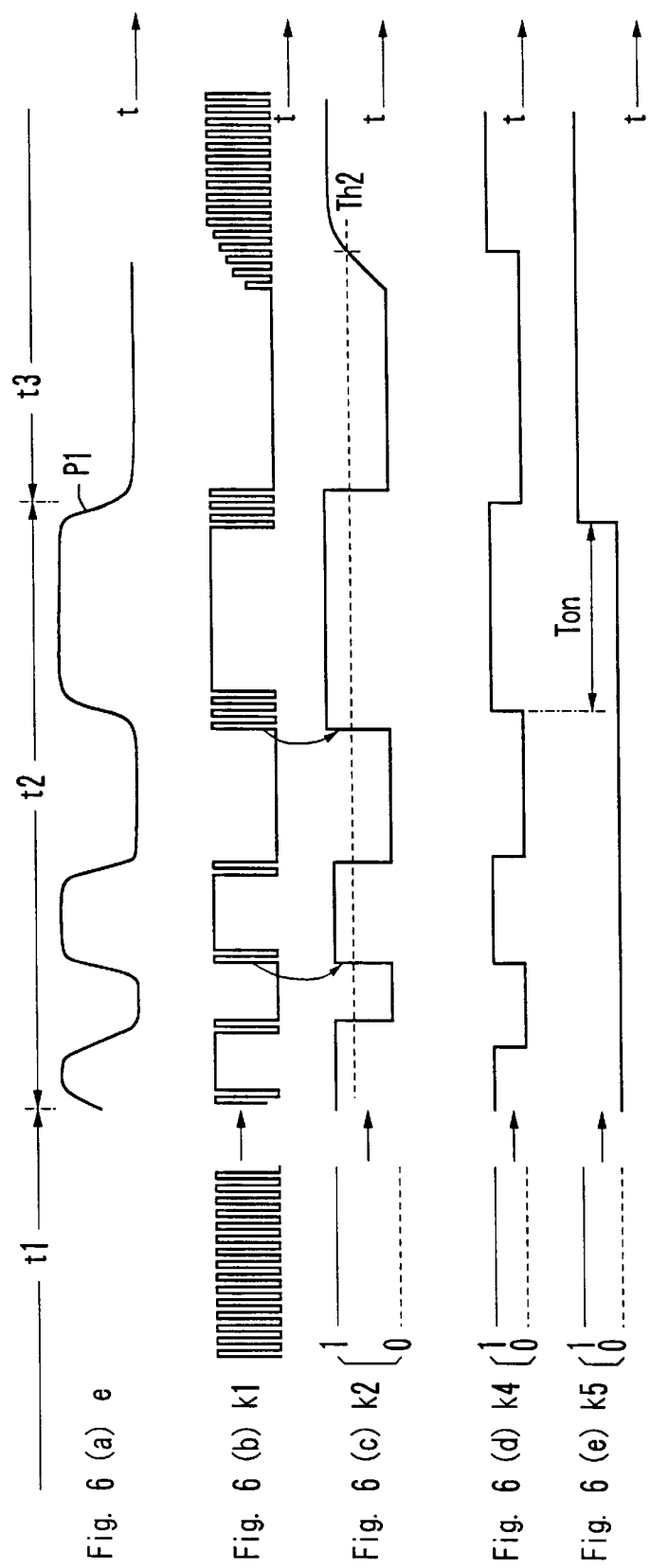
FIGS. 6(a)–6(e) is a time chart that illustrates the operation of the safety securing device shown in FIG. 1.

The AC amplifier A2 amplifies the high frequency signal w provided by the signal generator SG2 via the capacitor C1 and the AC signal e (see FIG. 6(a)) provided by the rotation detecting means 1 and provides the signal k1 (see FIG. 6(b)) thus amplified to a voltage doubler rectifying circuit RC2.

A coupling capacitor C2 of the voltage doubler rectifying circuit RC2 has a large capacitance. As a result, the high frequency signal w provided by the signal generator SG2 and the AC signal e provided by the rotation detecting means 1 are communicated to a rear stage via the coupling capacitor C2. A smoothing capacitor C3 of the voltage doubler rectifying circuit RC2, which is connected at a stage to the rear of the coupling capacitor C2, has a small capacitance. Consequently, while the high frequency signal w is subject to the smoothing effect imparted by the smoothing capacitor C3, the smoothing effect is not applied to the rotation detection signal c, which has a low frequency. Thus, although a rectified output k2 from the voltage doubler rectifying circuit RC2 changes while the mechanical movable portion is rotating, when the rotation stops, only the rectified and smoothed component of the high frequency signal w is output, to constitute a DC output signal.

The level detection circuit LV1, which is connected to a stage to the rear of the voltage doubler rectifying circuit RC2 tests the level of the rectified signal k2 output from the voltage doubled rectifying circuit RC2. In FIG. 6(c), the threshold level TH2, which is indicated with the dotted line, represents the verification level of the level detection circuit LV1. The level detection circuit LV1 outputs an output signal k4 (see FIG. 6(d)) only when the signal k2 output from the voltage doubler rectifying circuit RC2 is at a level higher than the threshold level TH2. The level detection circuit LV1 may be constituted of a fail-safe window comparator. A window comparator suited for this purpose is disclosed in U.S. Pat. No. 5,345,138.

The on-delay circuit OND measures the sustain time of the signal k4 output from the level detection circuit LV1. The sustain time of the signal k4 output from the level detection circuit is lengthened as the rotation of the mechanical movable portion Rot slows down. When the mechanical movable portion Rot is rotating, the on-delay time Ton of the on-delay circuit OND is longer than the sustain time of the signal k4 output from the level detection circuit LV1. As a result, when the mechanical movable portion Rot is rotating, the signal k5 is not output from the on-delay circuit OND.

When the speed of the rotation of the mechanical movable portion Rot is reduced to an extent that it may be considered that the rotation has almost stopped, the sustain time of the signal k4 output from the level detection circuit LV1 becomes longer than the on-delay time Ton of the on-delay circuit OND. Because of this, the signal k5 is output from the on-delay circuit OND. A diode D3 and a capacitor C4 are connected at a level to the rear of the on-delay circuit OND. The signal k5 output from the on-delay circuit OND is rectified by the diode D3 and also charges the capacitor C4. The capacitor C4 holds the signal k5 at peak, and this is intermittently generated as the mechanical movable portion Rot rotates. Then, when the mechanical movable portion Rot stops rotating, or the mechanical movable portion Rot slows down its rotation to an extent that it may be considered that the rotation has almost stopped, a continuous DC voltage is supplied to the electromagnetic relay RL2 to excite the electromagnetic relay RL2. When the electromagnetic relay RL2 is excited, the contact point becomes closed. The ON signal at the contact point then becomes a rotation-stop signal Z.

To summarize the operation described above, when the mechanical movable portion Rot is rotating, the electromagnetic relay RL1 of the rotation monitoring circuit 2 is excited and a rotation-existing signal Y is output as an ON signal at its contact point. When the mechanical movable portion Rot stops rotating or when it slows down its rotation rate to the point where it may be considered that the rotation has stopped, the electromagnetic relay RL2 of the rotation stop monitoring circuit 3 is excited, its contact point becomes closed and a rotation-stop signal Z is output as an ON signal at the contact point.

The movable portion control circuit 4, to which the rotation-existing signal Y, the rotation-stop signal Z and an external command signal are input, drives the power supply 5 that includes the motor M and the like with its logic. The power supply 5 drives the mechanical movable portion 6. The mechanical movable portion 6 includes the mechanical movable portion Rot, shown in FIGS. 2 and 4.

Figure 7:
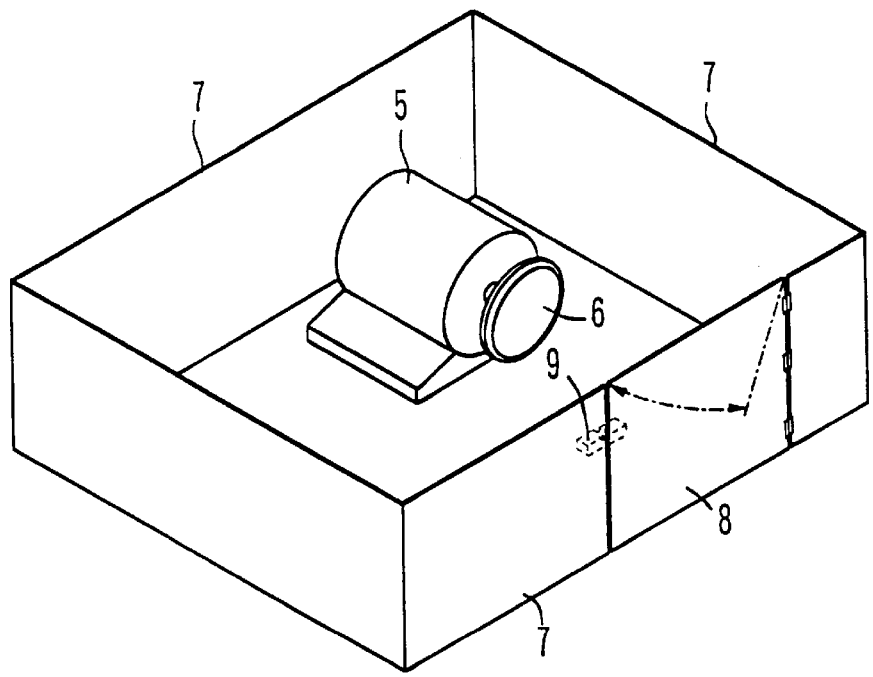
FIG. 7 is an electric circuit diagram of a movable portion control circuit included in the safety securing device according to the present invention.

Next, an explanation is given of a specific example of application of the safety securing device according to the present invention. In FIG. 7, the mechanical movable portion 6 and its power supply 5 are provided within the space enclosed by a fence 7 to avoid accidents. A door 8 for allowing the operator access is provided at a portion of the fence 7 and a locking device 9 is installed between the fence 7 and the door 8.

Figure 8:
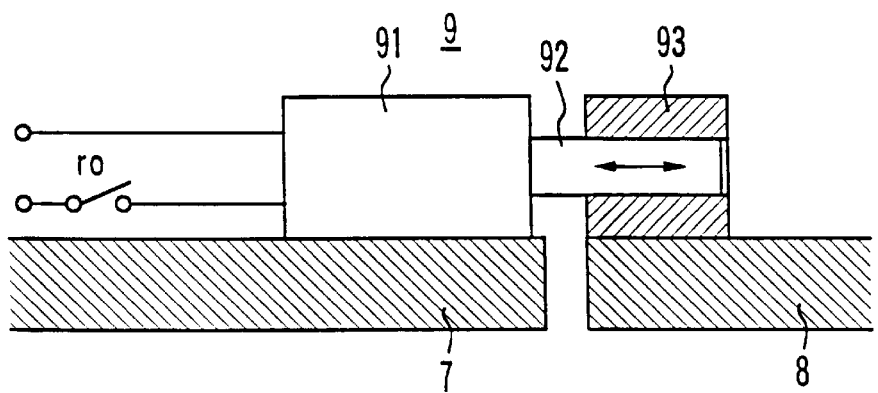
FIG. 8 is an electric circuit diagram of another embodiment of the movable portion control circuit included in the safety securing device according to the present invention.

FIG. 8 shows the locking device 9. The locking device 9 is provided with a solenoid 91 and a plunger 92. When the solenoid 91 is in an unexcited state, the plunger 92 is contained within a receptacle portion 93 and the lock is engaged. When the solenoid 91 is excited, the plunger 92 retracts and becomes disengaged from the receptacle portion 93 to release the lock. When the locking device 9 is unlocked, the door 8 can be opened. The excitation of the solenoid 91 is performed through, for instance, a contact point r0 of the electromagnetic relay RL2. The state in which the contact point r0 is closed corresponds to the stop of rotation of the mechanical movable portion Rot. The contact point r0 may be constituted of, for instance, the contact point of the electromagnetic relay RL2 shown in FIG. 1.

Figure 9:
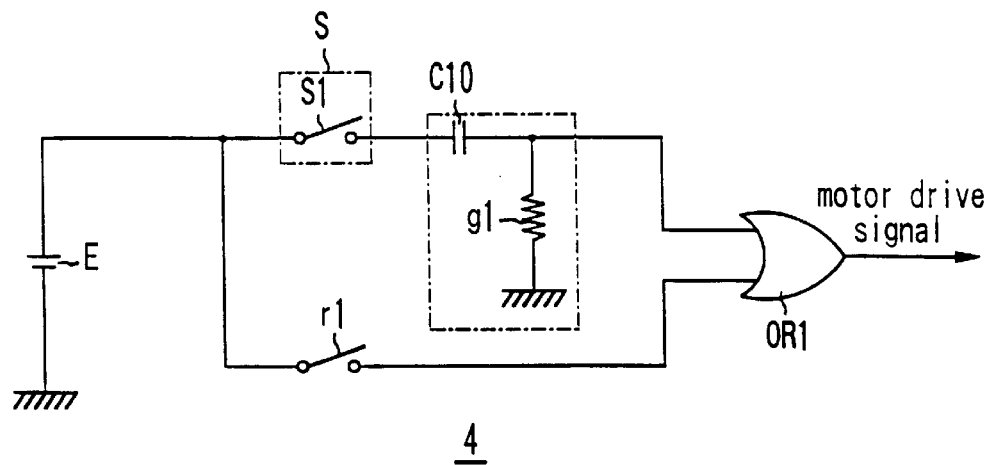
FIG. 9 is a perspective schematically showing the structure of a fence which encloses the mechanical movable portion.

One of the error modes of the rotation detecting means 1 is the drop off at the transmitting element 101 or the receiving element 102. When the transmitting element 101 or the receiving element 102 drops, the signal e output from the rotation detecting means 1 indicates a specific level. Because of this, even if the mechanical movable portion Rot is rotating, the electromagnetic relay RL2 included in the rotation stop monitoring circuit 3 becomes excited and its contact point closes. As a result, when the contact point of the electromagnetic relay RL2 is used to constitute the contact point r0 provided at the locking device 9, the door 8 is set in a state in which it can be opened. FIG. 9 shows a movable portion control circuit 4 that is effective for preventing such a danger state.

In FIG. 9, the movable portion control circuit 4 is provided with an operating switch S, a differentiating circuit, a contact point r1 of the electromagnetic relay RL1 and an OR circuit OR1. The letter E indicates a DC source. The operating switch S is manually operated by the operator and is provided with a contact point S1. The differentiating circuit is constituted of a capacitor C10 and a resistor g1. The contact point r1 is a contact point of the electromagnetic relay RL1, which is included in the rotation monitoring circuit 2, and becomes closed only when the electromagnetic relay RL1 becomes excited. The OR circuit OR1 uses a differential signal generated at the differentiating circuit when the contact point S1 of the operating switch S is closed and the signal generated when the contact point r1 is closed as its input signals and outputs an OR signal thereof. The OR signal is used as a signal for driving the power supply 5. The feature of this movable portion control circuit 4 is that the drive signal for the motor M constituting the power supply 5 is obtained through the OR circuit OR1 and not through an AND circuit.

When the operator presses the operating switch S2 to close the contact point S1, the signal at that point is differentiated by the differentiating circuit and the differential signal is provided to the OR circuit OR1. With this, a motor drive signal is output from the OR circuit OR1 and the motor M included in the power supply 5 starts rotating.

When the motor M starts rotating, the mechanical movable portion Rot included in the mechanical movable portion 6 starts rotating. If the sensor included in the rotation detecting means 1 is operating normally, the rotation of the mechanical movable portion Rot is detected by the sensor, the electromagnetic relay RL1 included in the rotation monitoring circuit 2 becomes excited and its contact point r1 becomes closed. After this, the output from the OR circuit OR1 is sustained by the input from the contact point r1 so that the rotation of the motor M is maintained.

If there is an error, such as the sensor included in the rotation detecting means 1 having dropped or the like, even when the motor M is started by setting the operating switch S1 to ON, the electromagnetic relay rl1 does not become excited and, consequently, its contact point r1 does not become closed. Because of this, the motor M cannot continue to rotate. Thus, safety at startup can be assured. The logic described above is established when the startup of the motor M can be maintained by the differentiating circuit only until the speed that is allowed in the detection of reduced speed in the rotation stop monitoring circuit 3 in the safety securing device shown in FIG. 1 is reached. It will be dangerous to provide a startup signal over a length of time width that exceeds the reduced speed detection speed. The values at the capacitor C10 and the resistor g1 in the differentiating circuit should be set to ensure that such a state will not occur.

The contact point r1 is open before the mechanical movable portion Rot starts rotating and, although it cannot start up the mechanical movable portion Rot by itself, start up may be achieved by operating the contact point S1 of the operating switch S and also with the differential signal at that point in time in the case of this embodiment.

Figure 10:
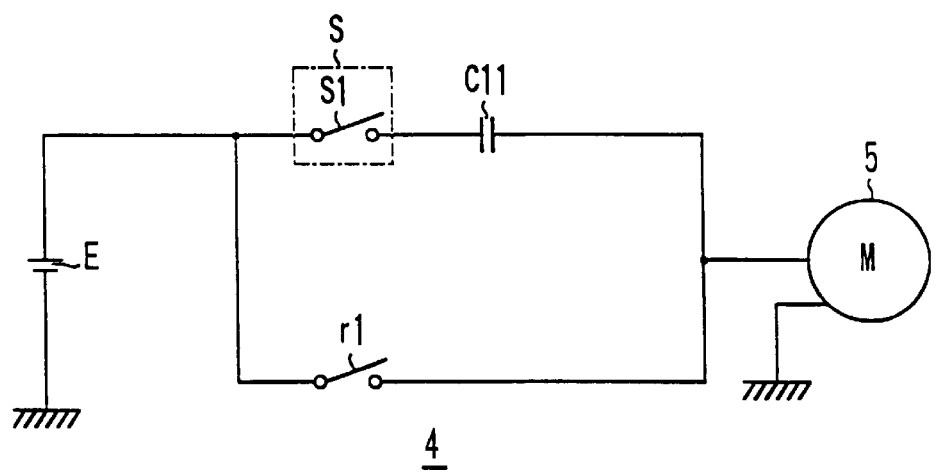
FIG. 10 is a partial cross section showing the structures of the fence and the locking device that is installed at the door, which are shown in FIG. 9.

FIG. 10 shows another embodiment of the movable portion control circuit 4. In this embodiment, a serial circuit is constituted of the contact point S1 of the operating switch S, a capacitor C11 and the circuit including the contact point r1 connected in a wired OR configuration and the motor M is driven with the OR logic thereof. The operation of the movable portion control circuit 4 shown in FIG. 10 is almost identical to that of the embodiment shown in FIG. 9 and its explanation is omitted.

Figure 11:
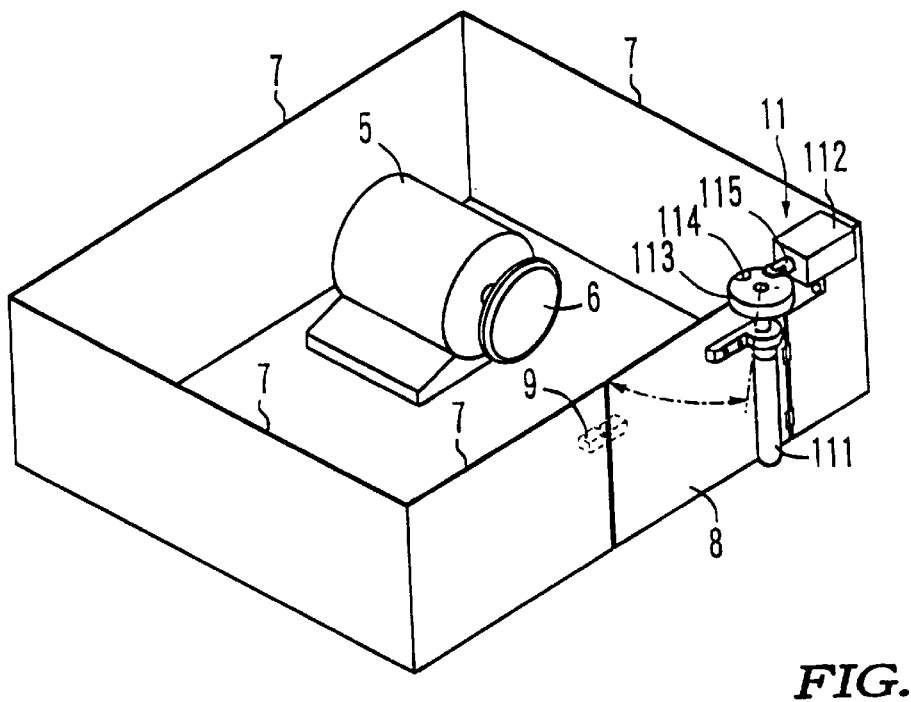
FIG. 11 is a perspective schematically showing another example of a fence enclosing the mechanical movable portion.

FIG. 11 shows the fence 7 and the door 8 enclosing the mechanical movable portion 6 and its power supply 5 with a door switch 11 installed. The door switch 11 is provided with an actuator 111 and a switch 112. The actuator 111 is provided secured on to the door 8 and has a disk-like cam 113 at its front end. The cam 113, in turn, is provided with an indentation 114 in its circumferential area. The switch 112 is mounted at the fence 7 and its arm piece 115 for switch operation is in contact with the cam 113 of the actuator 111. In the state shown in FIG. 11, in which the door 8 is closed, the front end of the arm piece 115 of the switch 112 is placed inside the indentation 114 of the cam 113. It is assumed that the switch 112 is turned on in this state. When the door 8 is opened, the actuator 111 rotates together with the door 8, and the arm piece 115 extending from the switch 112 becomes disengaged from the indentation 114 and becomes pressed by the external circumferential surface of the cam 113. The switch 112 is turned off in this state. A door switch 11 such as this already exists in the known art.

Figure 12:
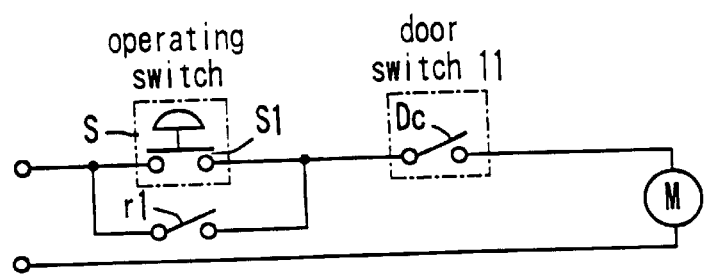
FIG. 12 is an electric circuit diagram of the movable portion control circuit that may be constituted when the fence and a door switch shown in FIG. 11 are provided.

FIG. 12 shows the structure of a movable portion control circuit 4 which is suited for a setup such as that shown in FIG. 11, in which the door switch is provided. In FIG. 11, when the door 8 is closed, the switch 112 of the door switch 11 becomes closed as explained earlier and a contact point Dc of the door switch 11 shown in FIG. 12 is closed. When the door 8 is closed, the power supply 5 and the mechanical movable portion 6 enclosed by the fence 7 can rotate. At this point, the contact point S1 is closed by pressing the operating switch S and the motor M of the power supply 5 is started up through the contact point Dc of the door switch 11. The operating switch S is a momentary switch which remains on only while the contact point S1 is pressed by the operator and is turned off when the contact point S1 is released. When the motor M rotates and gains a specific rotation rate, the electromagnetic relay RL1 of the rotation monitoring circuit 2 is excited and the contact point r1 becomes closed. Consequently, even if the contact point S1 of the operating switch S is opened, the motor M maintains its rotation. In this case, since the start up of the motor M is allowed while the door 8 is closed, no restriction is imposed as far as the startup time is concerned, unlike in the embodiments shown in FIGS. 9 and 10. Because of this, the contact point S1 of the operating switch S and the contact point r1 simply constitute an OR calculating circuit.

Figure 13:
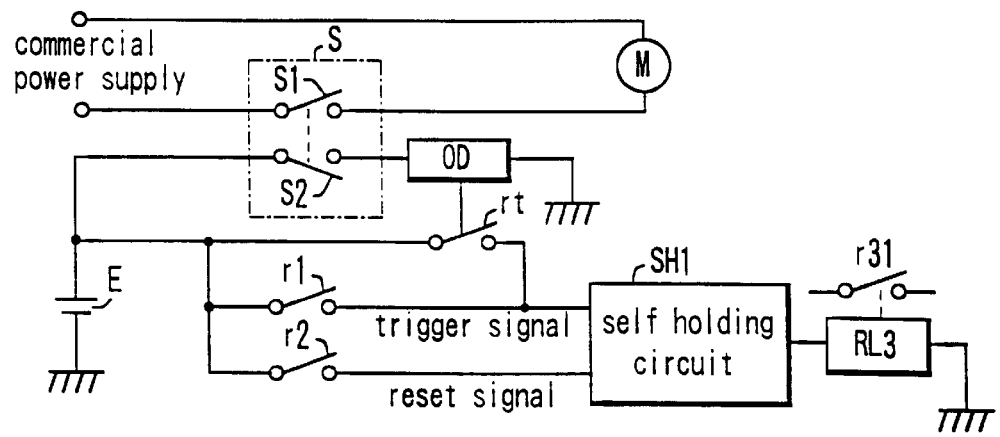
FIG. 13 is an electric circuit diagram of another example of the movable portion control circuit that may be constituted when the fence and the door switch shown in FIG. 11 are provided.

FIG. 13 shows another embodiment of the movable portion control circuit 4 that can be achieved when the door switch 11, shown in FIG. 11, is provided. In the embodiment shown in FIG. 13, the operating switch S is provided with two contact points, i.e., S1 and S2. The contact points S1 and S2 maintain a relationship in which when one is closed, the other is open. The contact point S1 is connected in series to the motor M and the contact point S2 is connected in series to an on-delay timer OD. A contact point rt of the on-delay timer OD, together with the contact point r1 of the electromagnetic relay RL1, which corresponds to the rotation-existing signal, constitutes an OR circuit. This OR circuit provides a trigger signal to a self holding circuit SH1.

A contact point r2 of the electromagnetic relay RL2 included in the rotation stop monitoring circuit 3 provides a reset signal to the self holding circuit SH1. The output from the self holding circuit SH1 is sent to an electromagnetic relay RL3. A contact point r31 of the electromagnetic relay RL3 is employed as a contact point r0 which is inserted in the locking device 9.

When the rotation of the mechanical movable portion Rot slows down and the contact point r2 closes, if the contact point r1 is still closed, resulting in a signal that indicates rotation, an output signal is immediately generated at the self holding circuit SH1 and with this self holding output, the electromagnetic relay RL3 is excited. However, if there is a failure in the sensor and the contact point r1 is in an open state, the self holding circuit SH1 is not triggered until the contact point rt of the on-delay timer OD becomes closed. In other words, if the time set at the on-delay timer OD is long enough, the contact point S1 of the operating switch S can be opened to stop the motor M. After this time has elapsed, the self holding circuit SH1 is triggered and the electromagnetic relay RL3 is excited. The solenoid of the locking device 9 is excited by the contact point r31 of the electromagnetic relay RL3. With this, the door 8 can then be opened.

Figure 14:
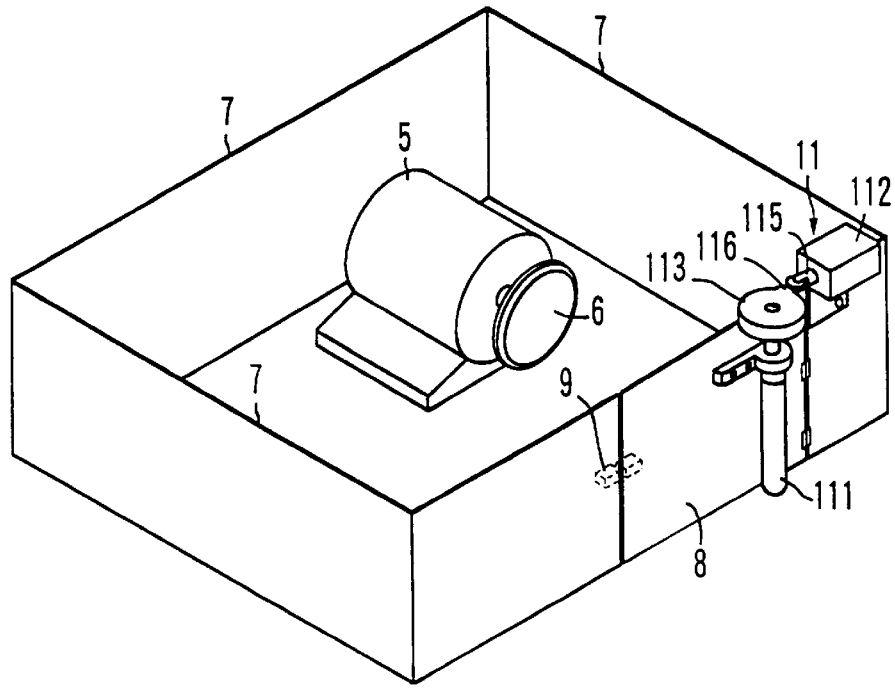
FIG. 14 is a perspective schematically showing another example of the fence surrounding the mechanical movable portion.

FIG. 14 shows another example of the fence 7 enclosing the mechanical movable portion 6 and its power supply 5, which employs a different door switch 11. This door switch differs from the door switch 11 shown in FIG. 11 in that a projected portion 116 is provided in the circumferential area of the cam 113 provided at the front end of the actuator 111. During the state shown in FIG. 14 in which the door 8 is closed, the arm piece 115 of the switch 112 is pressed by the projected portion 116 at the cam 113, which is provided at the cam 11. It is assumed that the switch 112 is turned off in this state. When the door 8 is opened, the actuator 111 rotates as the door 8 rotates and the arm piece 115 extending from the switch 112 becomes disengaged from the projected portion 116. The switch 112 is turned on in this state. This type of door switch 11 also exists in the known art.

Figure 15:
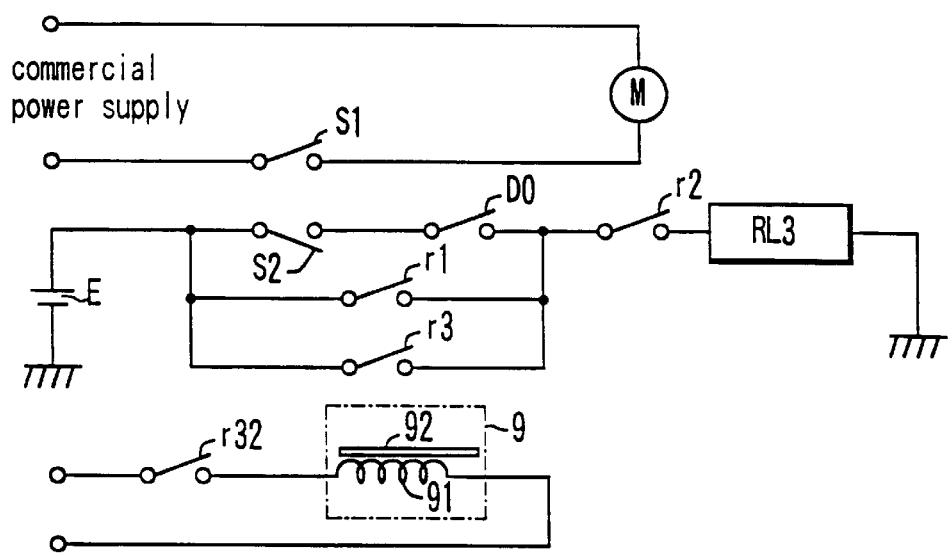
FIG. 15 is an electric circuit diagram of the movable portion control circuit that may be constituted when the fence and door switch shown in FIG. 14 are provided.

FIG. 15 is a circuit diagram of the movable portion control circuit that is suited for a structure provided with the door switch 11 shown in FIG. 14.

When the contact point S1 of the operating switch S is closed, the motor M rotates. At this point, the contact point S2 is open. In addition, since the mechanical movable portion Rot is rotating, the contact point r1 is in a closed state but the contact point r2 is in an open state. Since the door switch 11 is turned on during operation, the door switch D0 is turned off. As a result, the electromagnetic relay RL3 is in an unexcited state. A contact point r32 of the electromagnetic relay RL3 is inserted in series to a solenoid 91 of the locking device 9. Consequently, when the electromagnetic relay RL3 is in an unexcited state and the contact point r32 is open, the door 8 is locked by the locking device 9.

Then, when the operating switch S is turned off to stop the mechanical movable portion Rot, the contact point S1 is opened and the contact point S2 is closed. Since the door 8 remains closed, the contact point D0 of the door switch 11 is in an open state. Since the contact point r1 is closed and the contact point r2 is open while the mechanical movable portion Rot is rotating by inertia at a speed higher than a specific level, the electromagnetic relay RL3 is in an unexcited state and the door 8 remains locked. When the rotation rate of the mechanical movable portion Rot slows down to a level equal to or lower than a specific rate determined by the on-delay circuit OND shown in FIG. 1, the electromagnetic relay RL2 becomes excited and the contact point r2 is closed, and while the mechanical movable portion Rot is still rotating at a low rate, the electromagnetic relay RL1 of the rotation monitoring circuit 2 becomes excited and the contact point r1 is in a closed state. Because of this, the electromagnetic relay RL3 enters an excited state and a contact point r32 of the electromagnetic relay RL3 closes. Even if the contact point r1 opens subsequently, with the rotation of the mechanical movable portion stopped, the electromagnetic relay RL3 is excited through the contact points r3 and r2 and contact point r3 remains closed. With this, the holding effect is achieved. The solenoid 91 of the locking device 9 can be excited using the contact point r32 of the electromagnetic relay RL3.

When the door 8 is to be opened in a state in which the electromagnetic relay RL3 is excited, the contact point S1 of the operating switch S is in an open state and the contact point S2 is in a closed state. By opening the door 8 in this state, the contact point D0 of the door switch 11 enters a closed state and, as a result, the electromagnetic relay RL3 enters a state in which it is forcibly triggered by the contact points S2 and DO. The serial circuit constituted of the contact point S2 and the contact point D0 shorts the contact point r1. As a result, even when the source E is turned ON/OFF with the door 8 open, if the source E is in an ON state, the electromagnetic relay RL3 will cause the mechanical movable portion Rot to rotate again and, with this, an excited state can be maintained even without closing the contact point r1.

At the beginning of operation, when the contact point S1 of the operating switch S is set to a closed state, the contact point S2 enters an open state and also the contact point r2 enters an open state. Because of this, the electromagnetic relay RL3 enters an unexcited state and its contact point r32 is set to an open state to turn on the lock of the locking device 9.

A failure in the sensor does not present a problem as long as the door 8 is open. The contact point r1 monitors for a failure in the sensor, but care must be taken to ensure that the electromagnetic relay RL3 be set to an excited state again by the time the mechanical movable portion stops after the contact point S1 of the operating switch S is closed.

While a signal from the switch is used as an OFF signal in driving of the mechanical movable portion in the embodiment described above, detection may be performed by using a current sensor in driving the mechanical movable portion motor to perform logic calculation based upon the detection signal thereof. A sensor which detects non-application of an electric current is disclosed in U.S. Pat. No. 5,345,138, for instance. It is also obvious that the door switch, too, may output a signal from a sensor instead of a contact point.

The rotation stop monitoring circuit 3 may be achieved by adopting the technology disclosed in International Application PCT/JP95/00165 which was submitted by the applicant of the present invention. The technology disclosed in International Application PCT/JP95/00165 is especially effective when the rotation sensor includes the coil shown in FIGS. 4 and 5. An example of its application is explained below.

Figure 16:
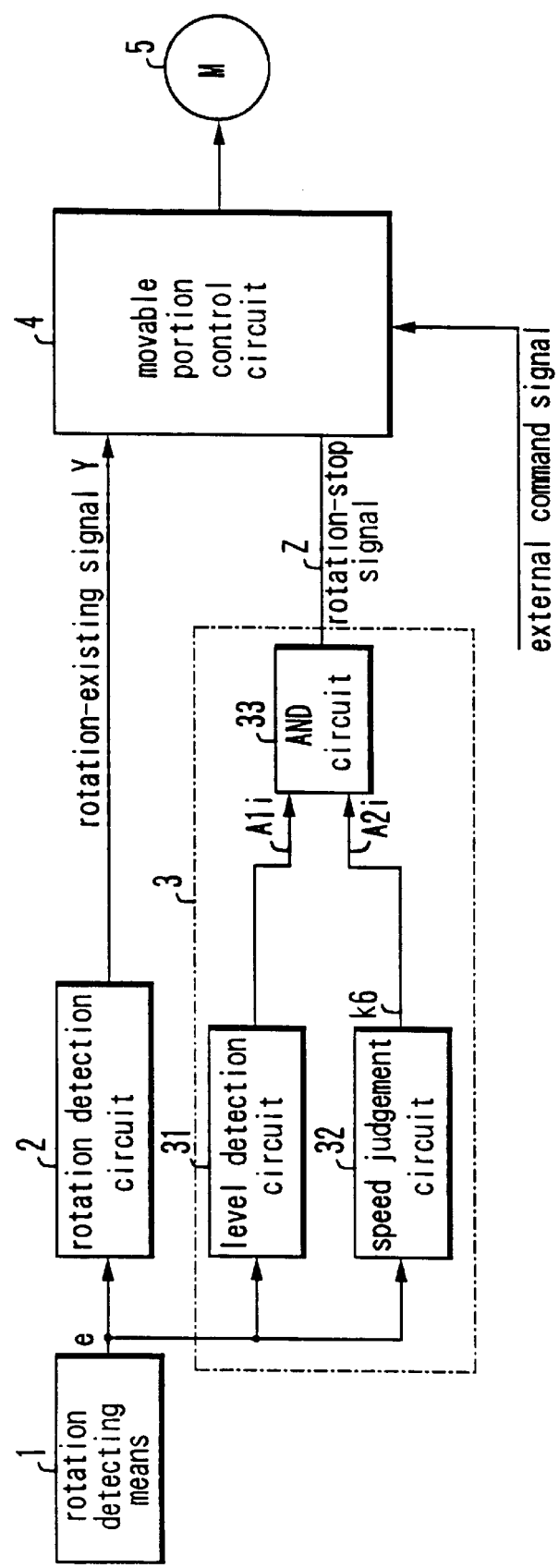
FIG. 16 is a block diagram of another example of the safety securing device according to the present invention.

In FIG. 16, the safety securing device according to the present invention includes a rotation detecting means 1, a speed judgement circuit 32, a level detection circuit 31 and an AND circuit 33. Since the explanation of the rotation detecting means 1 has already been given, its explanation is omitted here.

The speed judgement circuit 32, to which a detection signal e output from the rotation detecting means 1 is provided, outputs a high level output signal A2$i$ (logical value 1), when the signal e indicates a specific speed or lower.

The level detection circuit 31, to which the detection signal e is also output from the rotation detecting means 1, generates an output signal A1$i$ at a high level (logical value 1) when the detection signal e is at or higher than a specific level. The level detection circuit 31 is provided to monitor the distance L between the sensor constituted of a coil and the mechanical movable portion Rot.

The AND circuit 33, to which the output signals A1$i$ and A2$i$ are provided by the level detection circuit 31 and the speed judgement circuit 32 respectively, generates an output signal Z constituted of the AND calculation of the two output signals A1$i$ and A2$i$. When the sensor is mounted in a normal manner relative to the mechanical movable portion Rot if the output signal A1$i$ from the level detection circuit 31 is at high level (logical value 1), and the output signal A2$i$ from the speed judgement circuit 32 has logical value 1, the output signal Z from the AND circuit 33 is at high level (logical value 1) to indicate that the mechanical movable portion is stopped. When the logical value of either of the input signals is 0, the output signal Z is set to low (logical value 0).

The speed judgement circuit 32, to which the detection signal e output from the rotation detecting means 1 is provided, generates the output signal A2$i$ at high level (logical value 1) continuously when the change time interval of the detection signal e is at a specific length of time or longer. Since the change time interval of the detection signal e becomes longer as the rotation rate or traveling speed of the mechanical movable portion Rot becomes lower, the mechanical movable portion is assumed to have stopped when the change time interval of the detection signal e is at a specific length of time or longer, and the output signal A2$i$ at high level (logical value 1) is generated, which indicates that the mechanical movable portion has stopped. With this, the delay in issuing notification of stop of the mechanical movable portion Rot is reduced. The output signal A2$i$ at high level (logical value 1) indicating mechanical movable portion stop is output continuously. Thus, chattering of the mechanical movable portion stop notification is prevented.

The level detection circuit 31, to which the detection signal e output from the rotation detecting means 1 is provided, generates the output signal A1$i$ at high level (logical value 1) when the detection signal e is at or higher than a specific level. Thus, when a state arises in which the distance L is reduced and the mechanical movable portion Rot might come in contact with the coil, an output signal A1$i$ at low level (logical value 0) is output as a danger signal.

The AND circuit 33, to which the output signals A1$i$ and A2$i$ are provided from the level detection circuit 31 and the speed judgement circuit 32 respectively, generates the output signal Z constituted of the AND calculation of the two output with signals A1$i$ and A2$i$. Consequently, it is possible to issue notification of mechanical movable portion stop upon verifying that no danger state has arisen in which the coil may come in contact with the mechanical movable portion Rot.

International Publication WO 94/2303 discloses features such as: a signal for indicating rotation included in the output signal of the sensor circuit; the level detection circuit for monitoring to ensure that the output signal is within a specific level range; a rotation stop monitoring circuit that generates a high level output signal (logical value 1) when the rotation signal included in the output signal dissipates (indicating stop of rotation) and the AND calculation output signal constituted of the output signal from the level detection circuit and the output signal from the rotation stop monitoring circuit used as an output signal of rotation stop. However, this prior art technology does not include a mechanical movable portion speed judgement circuit. Thus, in order to achieve mechanical movable portion speed judgment, a special contrivance is required. A specific example of this is explained below.

Figure 17:
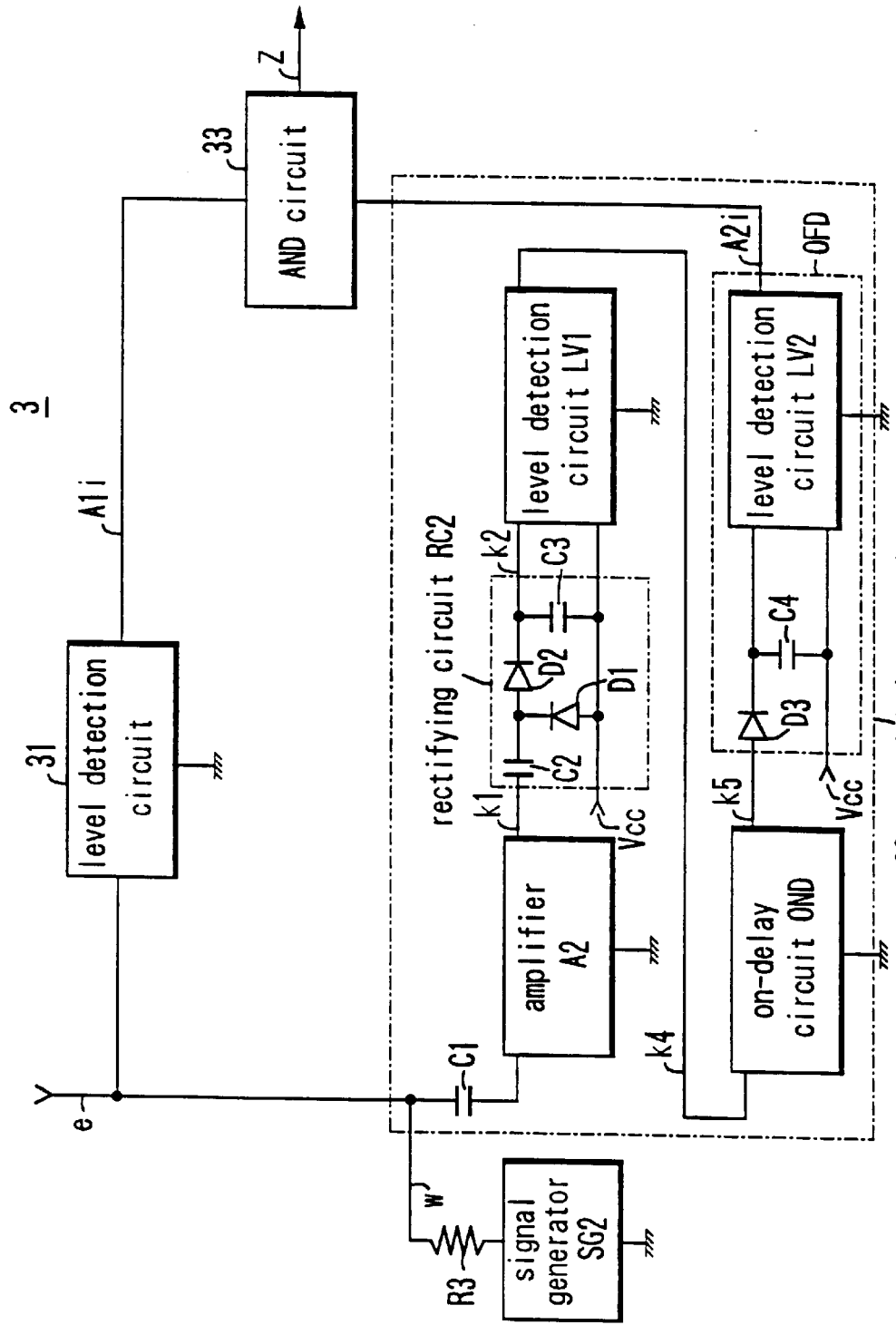
FIG. 17 is an electric circuit diagram of a specific example of the rotation stop monitoring circuit of the safety securing device shown in FIG. 16.

The speed judgement circuit 32, which is enclosed with the chain lines in FIG. 17, includes an amplifier A2 that amplifies the change in the output signal e that is output from the rotation detecting means 1, a rectifying circuit RC2 for generating the envelope detection output of the output signal from the amplifier A2, a level detection circuit LV1, an on-delay circuit OND for determining the rotation rate and an off-delay circuit OFD for generating an output signal at a high output level with logical value 1 from the time the mechanical movable portion Rot enters a low speed rotation state prior to stopping until the mechanical movable portion Rot enters a high speed rotation state again. The output signal from the off-delay circuit OFD becomes an input signal of the AND circuit 33 as an output signal A2i of the speed judgement circuit 32 along with the output signal A1i from the level detection circuit 31.

When constituting the level detection circuit 31, the LV1 and the AND circuit 33 as fail-safe elements, one of the fail-safe window comparator/AND gates disclosed in U.S. Pat. No. 5,345,138, U.S. Pat. No. 4,661,880 and U.S. Pat. No. 5,027,114 may be used. The same applies to the level detection circuits LV1 and LV2 and the AND circuit 8, which are to be explained later.

The change in the output signal e is input to the amplifier A2 via a coupling capacitor C1. In this case, if a disconnection failure should occur in the capacitor C1, no rotation signal is communicated to the amplifier A2 and, as a result, the speed judgement circuit 32 may indicate a rotation stop state even when the mechanical movable portion is rotating. In order to ensure that such a problem does not occur, a signal generator SG2 is provided in this embodiment. The signal generator SG2 may be trans-coupled with a transformer as shown in FIG. 1. A high frequency output signal w from the signal generator SG2 is superimposed on the signal e via a resistor R3 at low level (logical value 0) and this superimposed signal is i nput to the amplifier A2. The technology through which a rotation signal is monitored while taking into consideration a possible disconnection failure of the coupling capacitor C1 in this manner is disclosed in the International Publication WO 94/23303 mentioned earlier.

In addition, if a DC component is contained in the change in the output signal e generated as the mechanical movable portion Rot rotates, a clamp amplifier circuit constituted of a diode may be employed for an AC amplifier circuit which is constituted of the coupling capacitor C1 and the amplifier A2. A state in which a DC component is contained in the change in the output signal from the rectifying circuit RC1, which occurs as the mechanical movable portion Rot rotates, may arise when the time width over which the output signal is at high level (logical value 1) differs from the time width over which the output signal is at low level (logical value 0). The technology that employs a clamp amplifier circuit for an input signal with the sustained time over which it remains at high level (logical value 1) different from the sustained time over which it remains at low level (logical value 0) is already known through the disclosures made in Japanese Examined Patent Publication Nos. 4320/1980 and 34396/1975.

Figure 18:
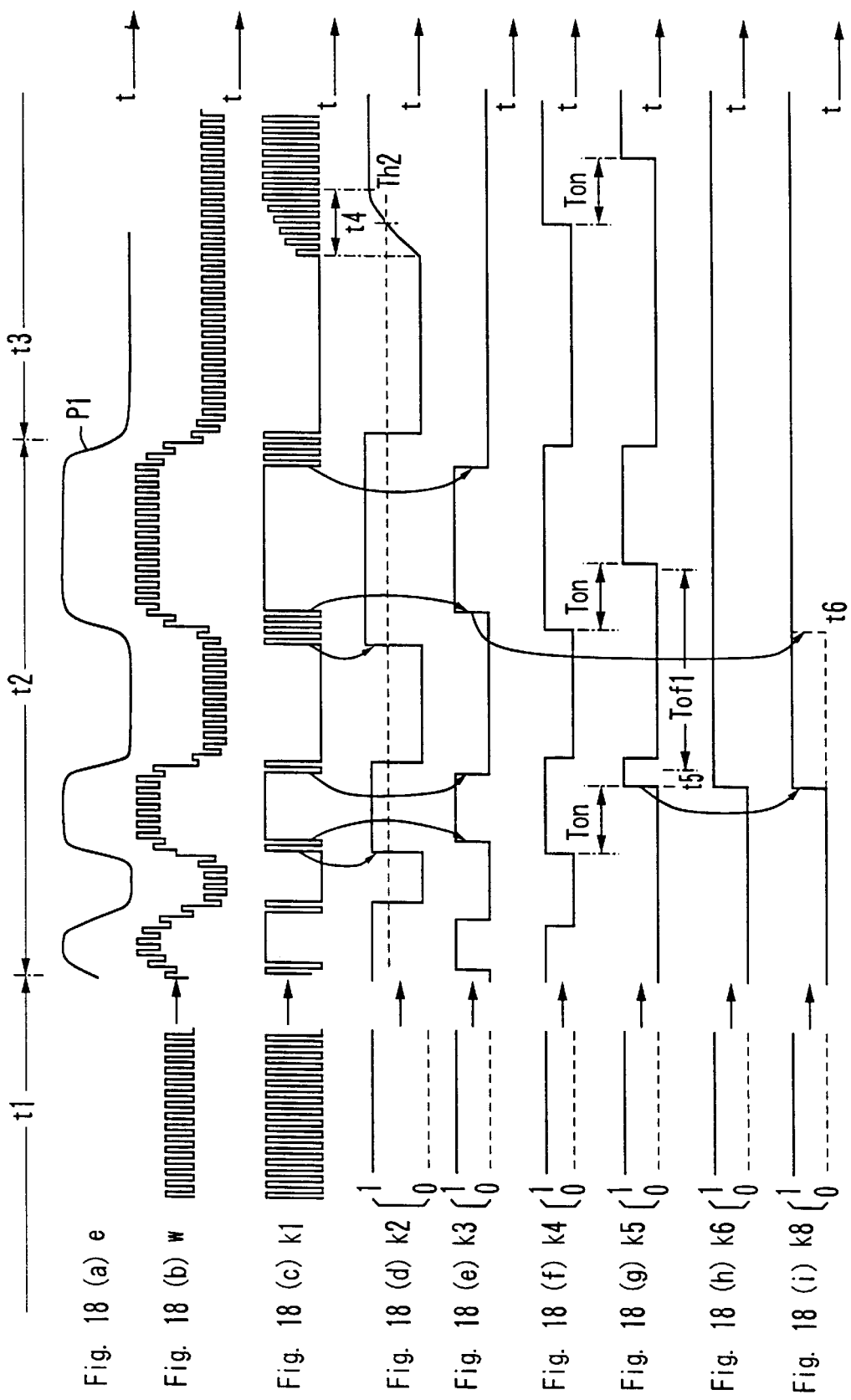
FIGS. 18(a)–18(i) is a time chart that illustrates the operation of the rotation stop monitoring circuit shown in FIG. 1.

Next, the principle structure and the operation of the speed judgement circuit 32 shown in FIG. 17 are explained in reference to the time chart shown in FIG. 18.

In FIGS. 18(a)–18(i), the time block t1 on the time axis t represents a period during which the mechanical movable portion Rot is in a stopped state prior to starting to rotate. Time block t2 represents a period during which the mechanical movable portion Rot is in a transition state in which the mechanical movable portion Rot shifts from a rotating state to a stopped state and time block t3 is a period during which the mechanical movable portion Rot is assumed to have reached the stopped state. FIG. 18(a) shows the output signal e from the rotation detecting means 1. During the time block t1, over which the mechanical movable portion Rot is in a stopped state, the output signal e indicates a constant value. During time block t2, the cycle of the change in the amplitude of the output signal e increases as the rotation of the mechanical movable portion Rot slows down. During time block t3, the mechanical movable portion Rot has entered a stopped state, and this stop is represented as an area between the indentations Py2 in the mechanical movable portion Rot shown in FIGS. 4 and 5, for instance.

FIG. 18(b) shows a state in which the output signal w that is output from the signal generator SG2 is superimposed on the signal e.

FIG. 18(c) shows an output signal resulting from the signal w being input to the amplifier A2 via the capacitor C1 and amplified. In the vicinity of the apex of the change in the signal e, since the input level is large, the amplifier A2 becomes saturated and the components of the signal w disappear. The components of the amplified signal w are generated only in the vicinity of the 0 point, which corresponds to the vicinity of the level which represents the average value of the signal e.

At the rectifying circuit RC2 on the output side of the amplifier A2, since the capacitance of a coupling capacitor C2 is sufficiently large, the change in the signal e resulting from rotation is manifested directly as a terminal voltage at a smoothing capacitor C3. The capacitance of the smoothing capacitor C3 is set to ensure that only the high frequency signal w is smoothed. Because of this, as shown in FIG. 18(d), only the high frequency signal w of the terminal voltage of the smoothing capacitor C3 is rectified and smoothed, and the portion representing the change in the signal e in the output signal from the amplifier circuit A2 is directly output between the terminals of the capacitor C3.

The output signal from the level detection circuit LV1, too, follows a pattern similar to that shown in FIG. 18(d). In other words, the rectifying circuit RC2 and the level detection circuit LV1 constitute a low pass filter through which a high level (logical value 1) output signal is generated for a high frequency input signal and an output signal responds to a low frequency input signal.

Since the mechanical movable portion Rot is stopped during time block t1, only the high frequency signal w is amplified at the amplifier A2, which is then output as an output signal k2 at high level (logical value 1) from the rectifying circuit RC2.

While time block t3 represents a state in which the mechanical movable portion Rot has stopped after completion of the change P1 in the signal e, the mechanical movable portion may, in fact, have moved slightly before reaching the next indentation Py2 after passing over an indentation Py2. The amplifier A2 amplifies this change and the component of the signal w is not generated at the coupling capacitor C1 until the electric charge accumulated because of this change has been discharged. The rise of the signal during time block t4 in FIGS. 18(c) and 18(d) represent this fact. The level Th2 entered in FIG. 18(d) indicates the threshold value of the level detection circuit LV1.

The on-delay circuit OND measures the length of time over which the level detection circuit LV1 remains in a high level state. In a DC high level state, the state of maximum level output is indicated with logical value 1 while the low level state corresponds to logical value 0. The on-delay circuit OND generates a high level (logical value 1) output signal k5 (see FIG. 18(g)) when a specific delay time Ton has elapsed after a high level (logical value 1) input signal k4 is input. This signal k5 with logical value 1 signifies that the rotation of the mechanical movable portion Rot is at or has fallen under a specific speed. Then, if the input signal k4 (see FIG. 18(f)) does not remain in the high level state (logical value 1) until the delay time Ton has elapsed and the logical value 0 is set within a short period of time t<Ton, the on-delay circuit OND measures again the period of time over which the high level state is sustained the next time a high level (logical value 1) input signal is generated and generates a high level (logical value 1) output signal k5 after the specific length of time Ton has elapsed. Circuits provided with such a function already exist in the known art, as disclosed in the International Publication WO 94/23303 mentioned earlier and in Japanese Examined Patent Publication No. 23006/1989.

Since the output signal k5 with logical value 1 that is output from the on-delay circuit OND is generated only when the input signal k4 is at high level (logical value 1), as shown in FIG. 18(g), the output signal with logical value 1 is generated only when the signal k4 is at high level (logical value 1) even after the mechanical movable portion Rot is rotating at a speed at or lower than a specific level and it is, therefore, intermittent. The off-delay circuit OFD is provided with a function for holding the output signal k5 from the on-delay circuit OND, which is generated intermittently as explained above. As shown in FIGS. 4 and 5, in a structure in which the rotation of the mechanical movable portion Rot is detected intermittently with the timing with which the coil TC comes opposite the indentations Py1 and Py2, it is necessary to hold the signal indicating detection of an indentation Py1 during the period of time after the signal generated by the detection of, for instance, the indentations Py1 by the coil TC is received until the signal indicating detection of an indentation Py2 is subsequently received. The off-delay circuit OFD is provided to assure such a holding function. In the embodiment shown in FIG. 17, the signal k5, which is output at high level (logical value 1) from the on-delay circuit OND, is integrated by a diode D3 and a capacitor C4 and its level is verified by level detection circuit LV2. Discharge of the electrical charge which has accumulated in the capacitor C4 is performed through the input resistance of the level detection circuit LV2. With this, the intermittent output signal k5 from the on-delay circuit OND is converted to a continuous high level (logical value 1) output signal k6 (see FIG. 18(h)).

FIG. 17 shows a circuit configuration in which the output signal from the rectifying circuit is clamped at the source potential Vcc. The reason for this is that the output signal from the amplifier A2 and the signals processed at the level detection circuits and the on-delay circuit are AC signals and that input signals at a level higher than that of the source potential are required for the input signals for the level detection circuits and the on-delay circuit.

Next, in reference to FIGS. 19 to 24, other embodiments of the rotation stop monitoring circuit in the safety securing device according to the present invention is explained. In these figures, the same reference numbers as those in FIGS. 16 and 17 are assigned to identical components.

Figure 19:
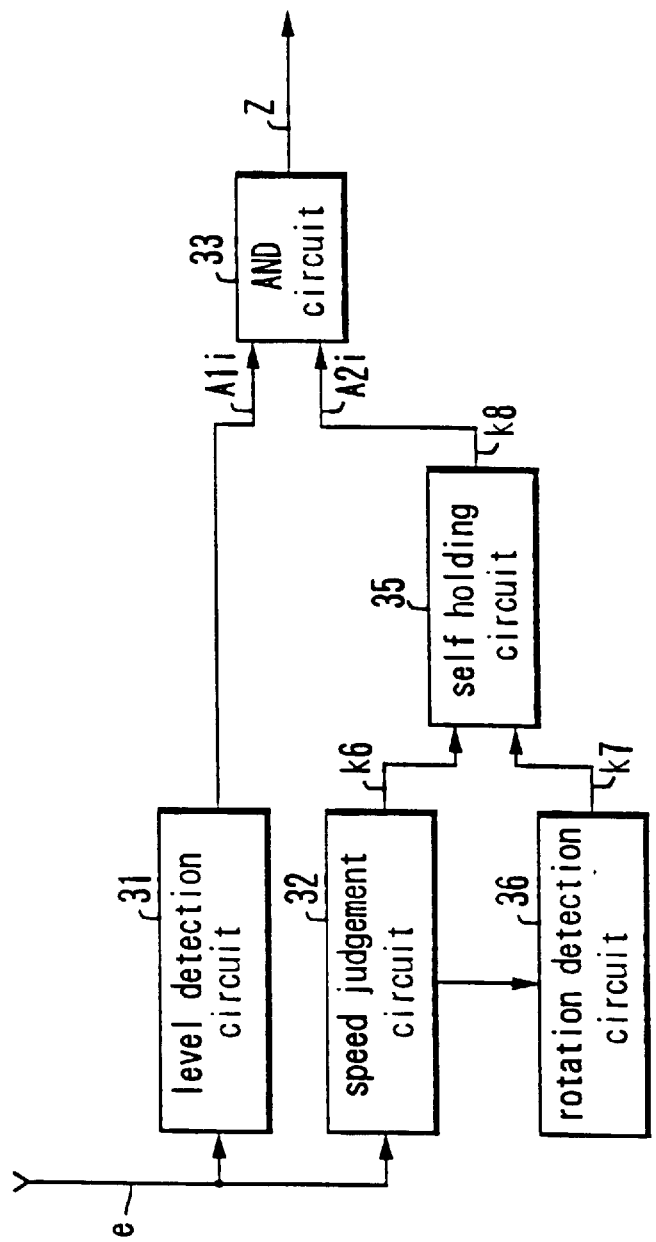
FIG. 19 is a block diagram showing another example of the rotation stop monitoring circuit.

First, in FIG. 19, the rotation stop monitoring circuit 3 includes a self holding circuit 35. The self holding circuit 35 uses the change in the output signal from the rotation detecting means 1 as a trigger input signal and uses the output signal k6 from the speed judgement circuit 32 as a reset input signal. The AND circuit 33, to which the output signals A2i and A1i are provided from the self holding circuit 35 and the level detection circuit 31 respectively, generates an output signal Z constituted of the AND calculation of the two output signals A2i and A1i. When the mechanical movable portion Rot is rotating or moving, the output signal e from the rotation detecting means 1 changes in conformance to the changes at the surface of the mechanical movable portion Rot, as explained earlier.

Since the self holding circuit 35 uses the change in the output signal e from the rotation detecting means 1 as a trigger input signal, the rotation or movement of the mechanical movable portion Rot is monitored at all times. The self holding circuit 35, upon receiving the trigger input signal described above, is further provided with the reset input signal k6 (see FIG. 18(h)) which is constituted of the output signal from the speed judgement circuit 32, and when the reset input signal is set to high (logical value 1), the self holding circuit 35 generates a high level (logical value 1) self holding output k8 (see FIG. 18(i)). As a result, in this embodiment, the notification of mechanical movable portion stop is issued based upon verification that the mechanical movable portion Rot has been monitored until immediately before the issuing of the notification.

The AND circuit 33, to which the output signals A2i and A1i are provided by the self holding circuit 35 and the level detection circuit 31 respectively, generates the output signal Z constituted of the AND calculation of the two output signals A2i and A1i. Consequently, notification that the mechanical movable portion has stopped may be issued based upon verification that the mechanical movable portion Rot has been monitored until immediately before the issuing of the notification of mechanical movable portion stop as well as based upon verification that the rotation detecting means 1 is combined with the mechanical movable portion Rot correctly without an error such as dropping taking place.

In the embodiment shown in the figure, a rotation detection circuit 36 is provided. The rotation detection circuit 36 is a circuit for detecting rotation. With this rotation detection circuit 36, a signal indicating rotation is extracted from the speed judgement circuit 32 and its output signal k7 is used as a trigger input signal and the output signal k6 from the speed judgement circuit 32 is used as a reset signal for the self holding circuit 35 while an output signal k8 from the self holding circuit 35 is used as an input signal for the AND circuit 33.

Figure 20:
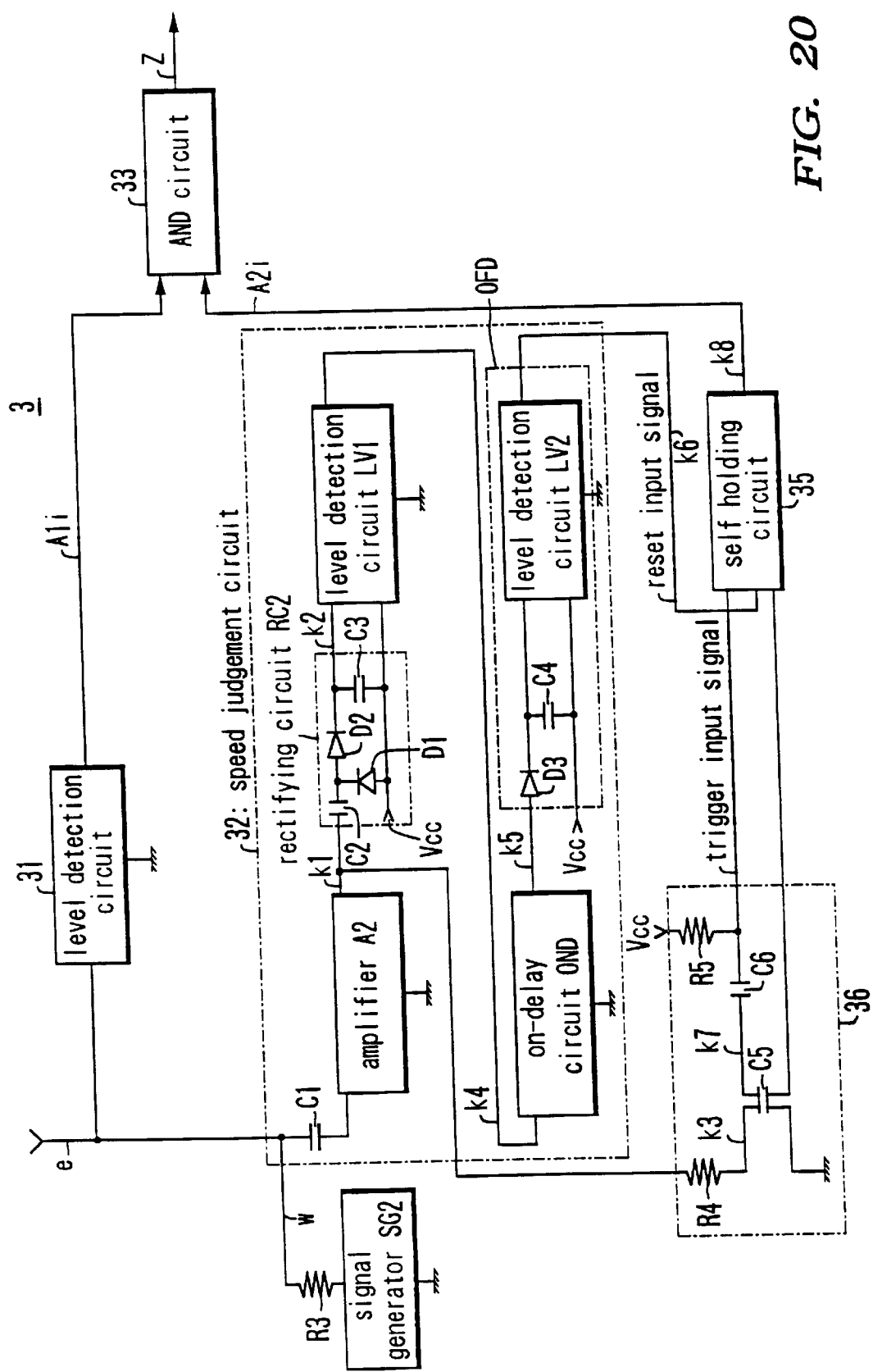
FIG. 20 is a specific circuit diagram of the rotation stop monitoring circuit shown in FIG. 19.

FIG. 20 shows a more specific circuit structure of the rotation stop monitoring circuit shown in FIG. 19. In FIG. 20, an output signal k1 from the amplifier A2, a constituent of the speed judgement circuit 32, is input to the rotation detection circuit 36, and an output signal k7 from this rotation detection circuit 36 becomes a trigger input signal for the self holding circuit 35. The rotation detection circuit 36 includes current limiting resistor R4, a 4-terminal capacitor C5, a coupling capacitor C6 and a discharge resistor R5. While the capacitor C6 and the resistor R5 constitute a differentiating circuit, if the time constant is large, the change in the voltage between the terminals of the capacitor C5 is directly used as a trigger input signal of the self holding circuit 35.

The signal k1, which is shown in FIG. 18(c) is input to the capacitor C5 via the resistor R4. The resistor R4 is inserted so that the capacitor C5 does not affect the output side of the amplifier A2. As in the case of the capacitor C3, the capacitance of the capacitor C5 has a low impedance relative to the high frequency signal w and, consequently, the terminal voltage signal k3 of the capacitor C5 is a signal similar to that shown in FIG. 18(d). The rise of the signal k3 becomes a trigger signal of the self holding circuit 35 via the capacitor C6.

The self holding circuit 35 uses the output signal k6 from the off-delay circuit OFD of the speed judgement circuit 32 as a reset signal. After the output signal k6 of the off-delay circuit OFD rises, the output signal k8 of the self holding circuit 35 is generated at the time point t5 concurrently with the rise of the output signal k6 if the capacitance of the coupling capacitor C6 is large, or is generated at the point in time (the time point t6) at which the terminal voltage of the capacitor C5 has risen next time if the capacitance of the coupling capacitor C6 is small since the trigger input signal becomes a differential signal in that case, as shown in FIG. 18(i).

In such a structure, even if the coil TC drops during rotation of the mechanical movable portion Rot, no output signal will be generated that erroneously indicates stop of rotation. In other words, in the rotation stop monitoring circuit shown in FIG. 20, the mechanical movable portion Rot is monitored until immediately before the signal k8 with logical value 1 is generated to indicate stop of rotation. The self holding circuit may be constituted by employing a circuit in the known art such as those disclosed in International Publication WO 94/23303 and International Publication WO 94/23496.

Figure 21:
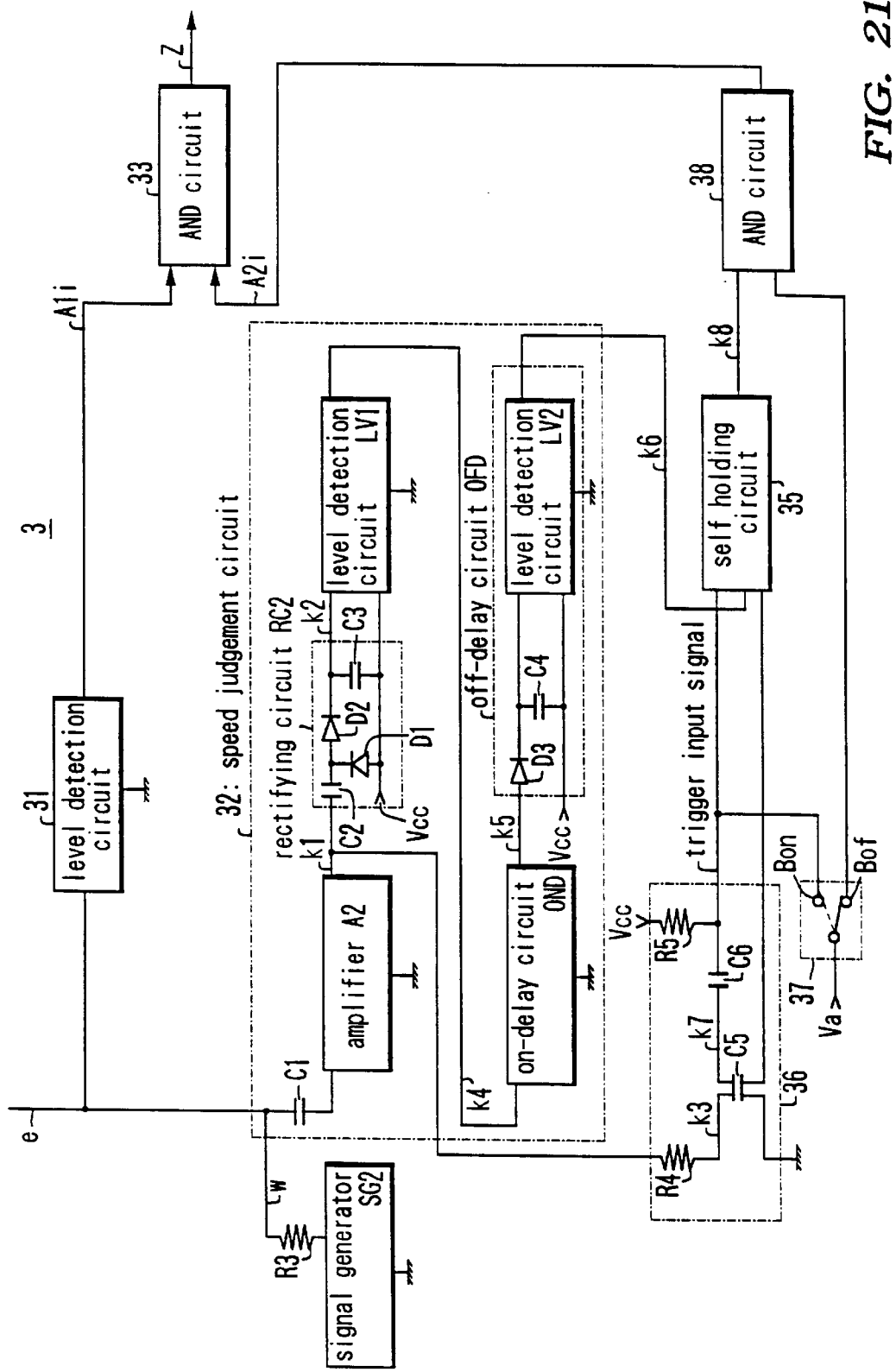
FIG. 21 is a circuit diagram of another example of the rotation stop monitoring circuit.

FIG. 21 shows yet another embodiment of the rotation stop monitoring circuit according to the present invention. In the embodiment shown in FIGS. 19 and 20, unless the mechanical movable portion Rot is rotating when the source voltage Vcc is applied, the output signal from the self holding circuit 35 does not enter a high level state with logical value 1, which indicates stop of rotation. The embodiment shown in FIG. 21 provides a solution to this problem. As a means for achieving the solution, the device in FIG. 21 is provided with a switch 37. If the mechanical movable portion Rot is stopped at power-up, logical value the output signal k6 from the off-delay circuit OFD is set to 1. In this state, the switch 37 is connected to the side of the contact point Bon and set to ON in order to forcibly provide a DC input signal Va at high level (logical value 1) for the self holding circuit 35 as a trigger input signal. With this, the output signal k8 of the self holding circuit 35 enters a high level state with the logical value 1, which indicates stop of rotation and, as a result, even at power-up, the output signal k8 from the self holding circuit 35 can be set in a high level state which corresponds to the stop of rotation of the mechanical movable portion.

If an error occurs such as the input signal Va supplied from the outside remaining in a closed state on the contact point Bon side and being, as a result, constantly input, the self holding circuit 35 will generate output whose logical value is 1 at all times. As a means for avoiding such a condition, an AND circuit 38 is provided. By reversing the switch 37 from the contact point Bon to a contact point Bof, a high level input signal Va is provided for the AND circuit 38 through the contact point Bof and the AND circuit 38 uses the AND output signal of this input signal Va and the output signal k8 from the self holding circuit 35 as an input signal A2i for the AND circuit 33. As a result, since the output signal k8 output from the self holding circuit 35 is set to high only when a normal trigger input signal resulting from stop of rotation of the mechanical movable portion Rot is provided by the rotation detection circuit 36, the error described above does not occur.

Figure 22:
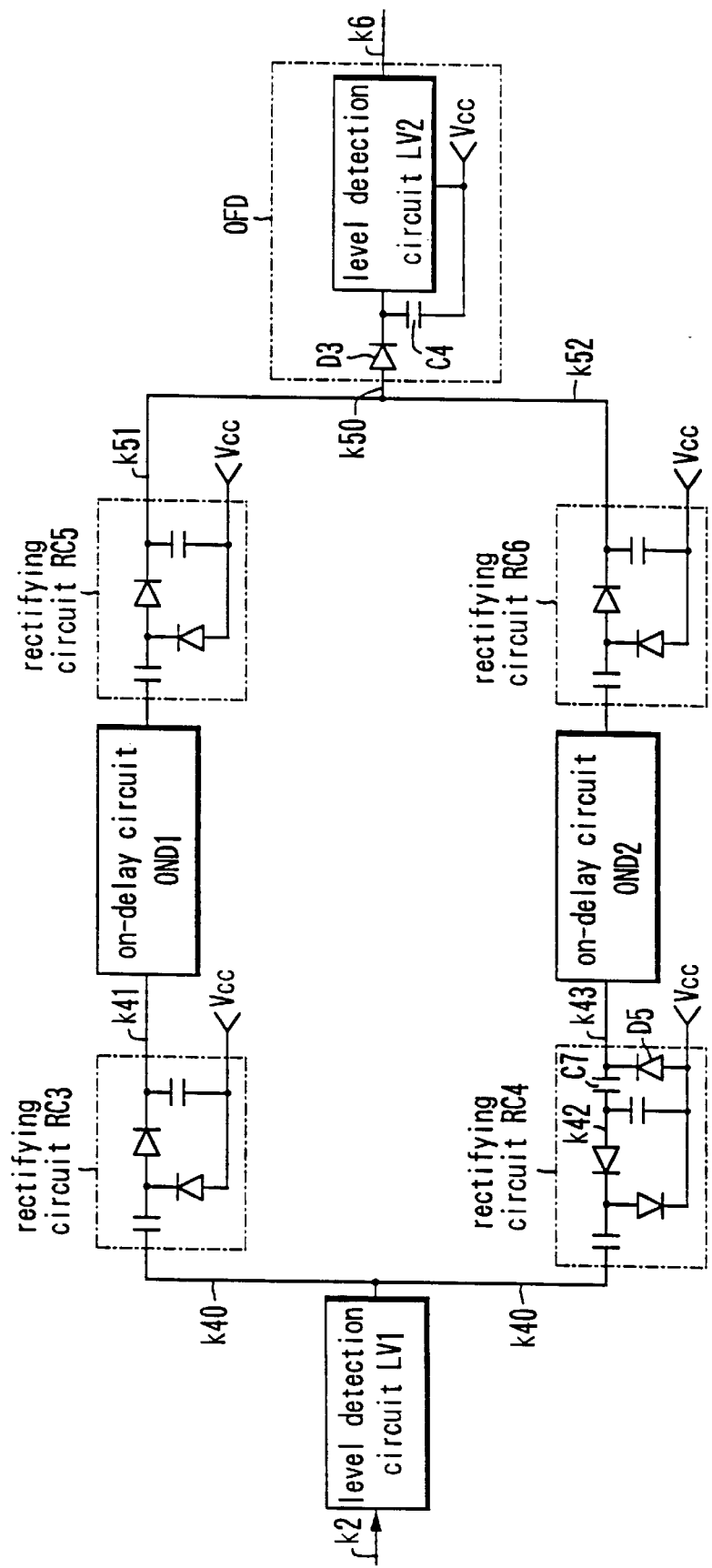
FIG. 22 is an electric circuit diagram of yet another example of a speed judgement circuit included in the rotation stop monitoring circuit.
Figure 23:
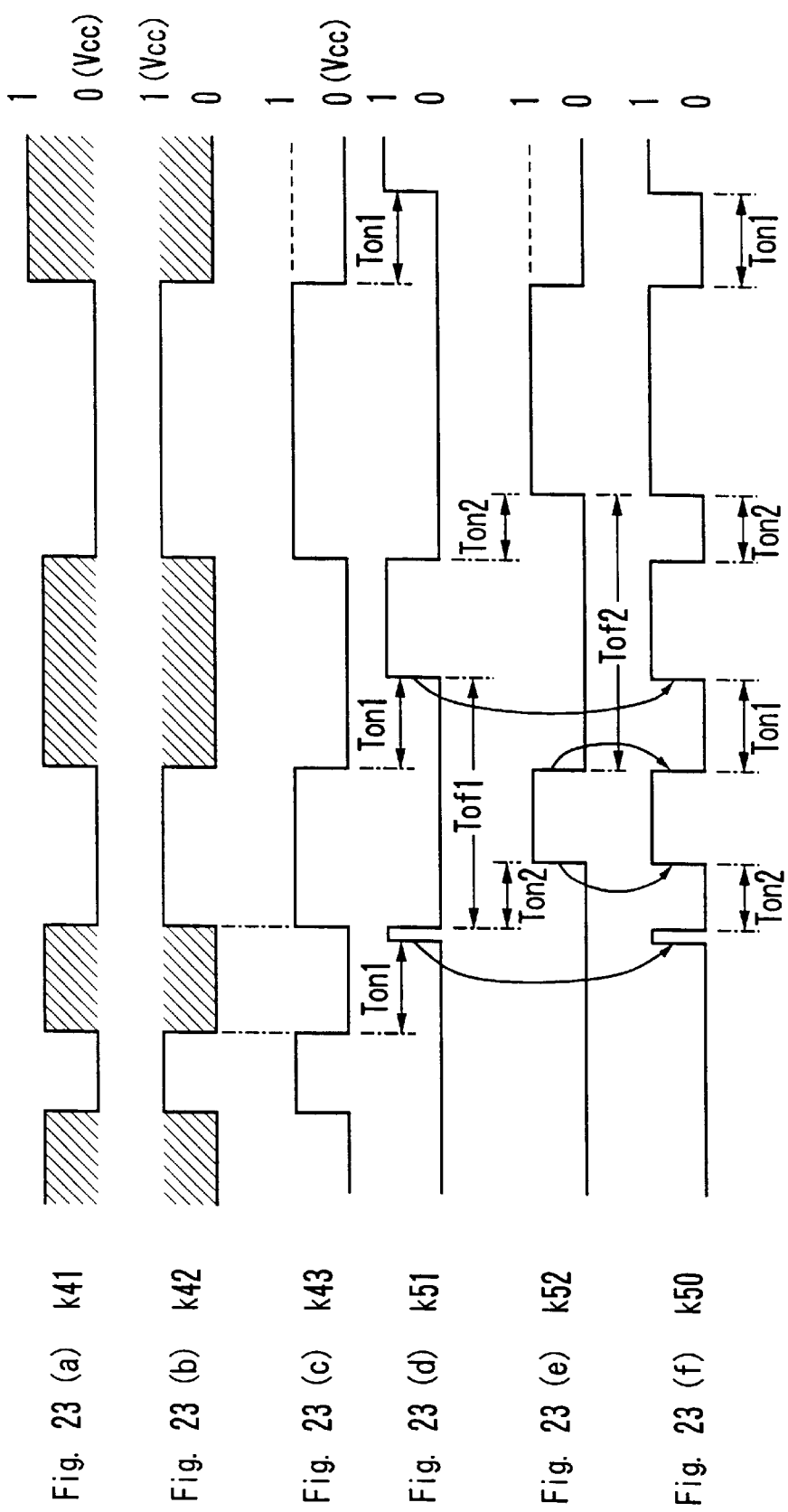
FIGS. 23(a)–23(f) is a time chart that illustrates the operation performed when the speed judgement circuit shown in FIG. 22 is employed.

Next, in reference to FIG. 22, yet another embodiment is explained. In the embodiment shown in FIGS. 19 and 20, if the coil TC has already dropped at power-up, an erroneous stop verification signal Z will be generated. Taking into consideration the possible falling down of the coil, the device disclosed in international Publication WO 94/23303 mentioned earlier is provided with a coil on one side of the bridge circuit to ensure that an output signal for stop verification is generated only within a limited range of distance between the metal mechanical movable portion and the coil. As a means for achieving this, the level detection circuit is constituted of a window comparator circuit, having upper limit and lower limit threshold values. However, a bridge circuit requires complicated adjustment. In order to eliminate this problem, in the present invention, the coil TC constitutes a resonance circuit that includes the mechanical movable portion Rot.

FIG. 22 shows yet another embodiment of the rotation stop monitoring circuit according to the present invention. The circuit in FIG. 22 includes a rectifying circuit RC3, a rectifying circuit RC4, an on-delay circuit OND1, a rectifying circuit RC5, a capacitor C7 for AC coupling, a clamp diode D5, an on-delay circuit OND2, a rectifying circuit RC6 and an off-delay circuit OFD.

The rectifying circuit RC3 rectifies an AC output signal k40 from the level detection circuit LV1 to a positive voltage signal. The rectifying circuit RC4 rectifies the AC output signal 40 of the level detection circuit LV1 to a negative voltage signal. The on-delay circuit OND1 operates with a specific delay relative to the rise of an output signal k41 from the rectifying circuit RC3. The rectifying circuit RC5 rectifies an AC output signal from the on-delay circuit OND1 to generate an output signal k51. The capacitor C7 for AC coupling communicates the AC component of an output signal k42 of the rectifying circuit RC4. The AC signal k43 that is communicated is clamped at a source potential Vcc by the clamp diode D5 to be input to the on-delay circuit OND2. The on-delay circuit OND2 uses the signal k43, which is transmitted via the capacitor C7, as an input signal. The rectifying circuit RC6 rectifies an AC output signal from the on-delay circuit OND2 to generate an output signal k52. An OR (wired OR) constituted of the output signal k51 from the rectifying circuit RC5 and the output signal k52 from the rectifying circuit RC6 is input to the off-delay circuit OFD.

The route through which the AC output signal k40 of the level detection circuit LV1 is converted to the DC output signal k41 of the rectifying circuit RC3 and then is communicated as the output signal k51 of the rectifying circuit RC5 through the on-delay circuit OND1 and the route through which the AC output signal k40 from the level detection circuit LV1 is converted to the output signal k42 from the rectifying circuit RC4 and is then communicated as the DC output signal k52 of the rectifying circuit RC6 via the on-delay circuit OND2 are constituted, as far as the circuit structure is concerned, to have a function identical to that of the route through which the signals are communicated from the level detection circuit LV1 through the on-delay circuit OND in FIGS. 17 and 20 except for the circuit structures of the rectifying circuits RC3 andRC4 and the signal communication path constituted of the capacitor C7 and the diode D5.

Next, in reference to the time chart shown in FIGS. 23(a)–23(f), the operation of the circuit shown in FIG. 22 is explained. The output signal k40 from the level detection circuit LV1 is rectified at the rectifying circuit RC3 and is generated as the positive rectified output signal k41. This rectified output signal k41 changes between the source potential Vcc (logical value 0) and a positive output voltage (logical value 1) which is at a higher level than the source potential Vcc, in conformance to the presence/absence of indentations Py2 of the mechanical movable portion Rot, as shown in FIG. 23(a). The shaded areas indicate the time intervals during which the rectified DC output signal k40 is generated.

The output signal k51 from the on-delay circuit OND1 is generated with a delay of equivalent to the rise delay time Ton1 of the on-delay circuit OND1 after the rectified output signal k41 is generated, as shown in FIG. 23(d). Then, as shown in FIG. 18(g), the duration of output dissipation time constituted of the time Tof1 constitutes wait time.

The output signal k42 from the rectifying circuit RC4 that rectifies the output signal k40 from the level detection circuit LV1 to a negative signal becomes a signal that changes between the source potential Vcc (logical value 1) and a negative output voltage (logical value 0) that is at a lower level than the source potential Vcc in conformance to the presence/absence of an indentation Py2 of the mechanical movable portion Rot, as shown in FIG. 23(b). The shaded areas indicate the time intervals over which the rectified DC output signal k42 is generated. This output signal k42 is input to the on-delay circuit OND2 as the signal k43 (see FIG. 23(c) via the capacitor C7 and the clamp diode D5. Since the signal k43 is clamped at the source potential Vcc by the diode D5, the level of the logical value 0 is set to the source potential Vcc, as shown in FIG. 23(c). The output signal k52 (see FIG. 23(e)) obtained through the on-delay circuit OND2 and the rectifying circuit RC6 is generated with a delay equivalent to the rise delay time Ton2 of the on-delay circuit OND2 after the signal k43 is generated, and then, as shown in FIG. 23(e), after the signal k43 has dissipated, a wait state exists until the output dissipation time constituted of the time period Tof2.

The off-delay circuit OFD uses the OR signal k50 constituted of the output signal k51 from the rectifying circuit RC5 and the output signal k52 from the rectifier switched RC6 as its input signal. In the case of the OR signal k50, an interval where the logical value is 0 (low level interval) is generated by the rise delays of the two on-delay circuits OND1 and OND2, as shown in FIG. 23(f) and, as a result, the length of time over which it is continuously off is reduced compared to the output dissipation time in the on-delay circuit shown in FIG. 18(g).

This period of time over which the output is continuously off is significant from the viewpoint of safety. Namely, when the mechanical movable portion Rot starts to rotate at high speed after stopping temporarily, the output signal from the on-delay circuit dissipates immediately because of the resulting rotation signal. However, the output signal from the off-delay circuit does not dissipate immediately and there will be a delay corresponding to the fall delay time of the off-delay circuit. Thus, as far as safety is concerned, it is desirable that the delay time of the off-delay circuit be short. In the embodiment shown in FIG. 22, a function for low speed judgment effected by an anti-phase signal of the output signal from the level detection circuit LV1 is added to the on-delay circuit OND1, and the function of the off-delay circuit OFD is incorporated in the OR output signal k50 constituted of the output signals k51 and k52 from the on-delay circuits OND1 and OND2. This makes it possible to reduce the delay time caused by the off-delay circuit OFD.

Figure 24:
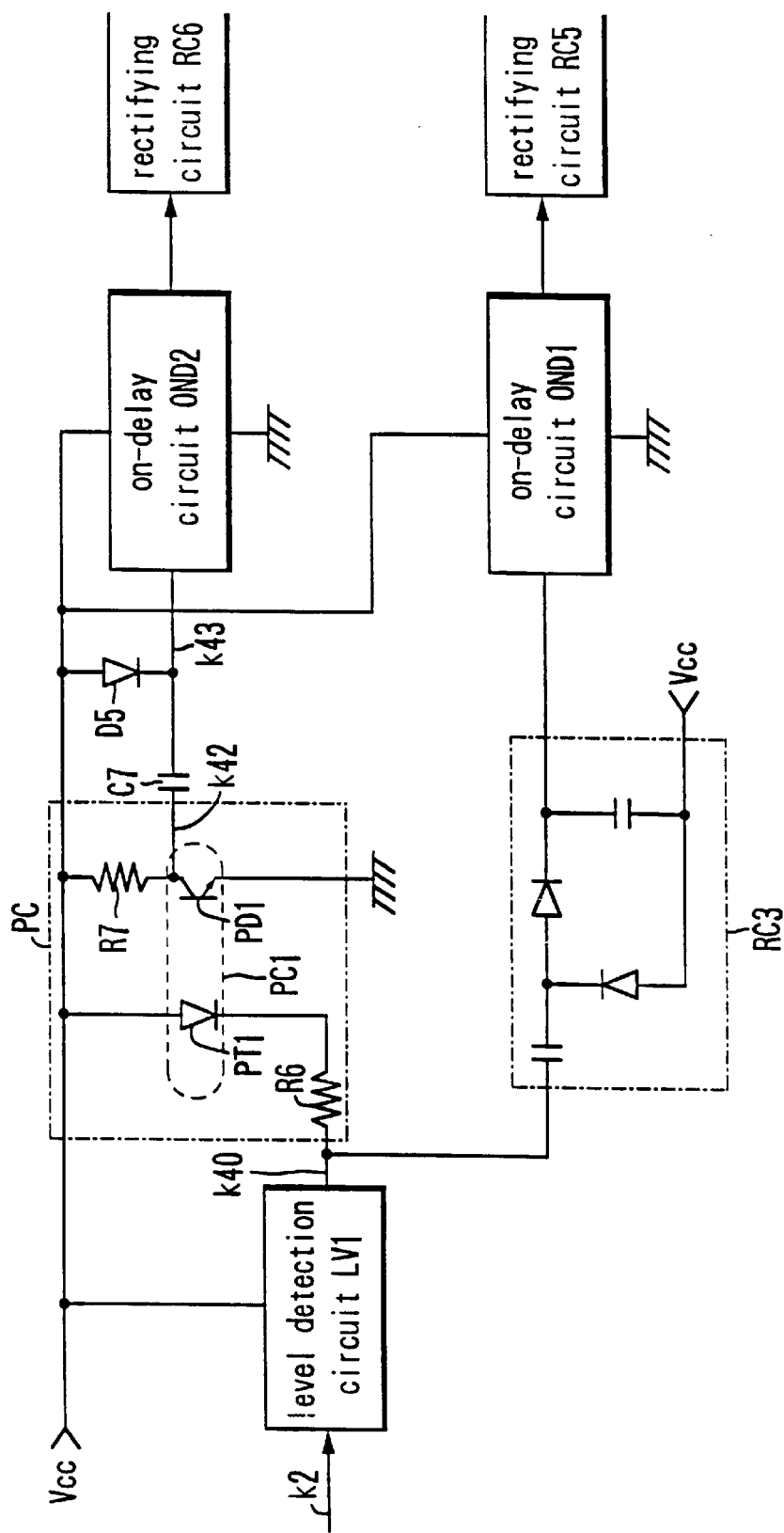
FIG. 24 is an electric circuit diagram of a variation of the speed judgement circuit.

In FIG. 24, an optically coupled circuit PC is employed in place of the negative rectifying circuit RC4 shown in FIG. 22. The circuit optically coupled PC includes an optically coupled element PC1 constituted of a light emitting element PT1 and a light receiving element PD1, a current limiting resistor R6 and a load resistor R7 for the light emitting element PD1. Note that the same reference numbers as those in FIG. 22 are assigned to indicate identical components.

An output current signal k40 from the level detection circuit LV1 is provided for the light emitting element PT1 via the resistor R6. An optical output signal from the light emitting element PT1 is received at the light receiving element PD1 and when this happens, the terminal voltage of the load resistor R7 changes to generate a signal k42. The signal k42 is output with its phase inverted relative to the optical signal from the light emitting element PT1. In addition, since the high frequency component is not communicated through an optically coupled element, the signal K42 forms a waveform identical to that shown in FIG. 23(b).

While the present invention has been explained in detail in reference to the preferred embodiments, it will be obvious to a person skilled in the art to which the present invention pertains, that it is not limited to these embodiments and that a number of variations are possible based upon the teachings and spirit of the present invention.

The present invention provides the following possibilities for industrial application:

(a) An apparatus that assures safety by using a mechanical movable portion OFF signal and a mechanical movable portion ON signal as signals for assuring the safety of an operator against the mechanical movable portion can be provided.

(b) When constituting a guard system, in which the mechanical movable portion is enclosed by a fence with a door provided with a locking device mounted at a portion of the fence to allow the operator to approach the mechanical movable portion within the fence when the locking device on the door is released, an apparatus that assures safety by using a mechanical movable portion OFF signal and a mechanical movable portion ON signal as signals for assuring the safety of an operator against the mechanical movable portion can be provided.

I claim:

1. A safety security device comprising:

a rotation detecting means detecting rotation of a mechanical movable portion and outputting a detection signal corresponding to a rotation rate thereof;

a rotation monitoring circuit, to which said detection signal from said rotation detecting means is provided, outputting a rotation-existing signal when said detection signal indicates that said mechanical movable portion is rotating;

a rotation stop monitoring circuit, including a speed judgment circuit and a level detection circuit, to which said detection signal from said rotation detecting means is provided, outputting a rotation-stop signal when said detection signal indicates a rotation rate lower than a predetermined rotation rate;

a movable portion control circuit using said rotation-existing signal, said rotation-stop signal and an external command signal for input signals to control said mechanical movable portion with logic thereof;

said mechanical movable portion being enclosed by a fence and a door provided at a portion of said fence, and;

said door including a locking device, with said locking device being not allowed to be released while said mechanical movable portion is rotating and being allowed to be released when an indication is made that said rotation rate of said mechanical movable portion is lower than said predetermined rotation rate that has been pre-set at said rotation stop monitoring circuit;

wherein said movable portion control circuit starts said mechanical movable portion at a rotation rate lower than said rotation rate that has been pre-set at said rotation stop monitoring circuit within a rotation rate range that allows said rotation-existing signal to be output from said rotation monitoring circuit, and sustains operation of said mechanical movable portion with said rotation-existing signal output from said rotation monitoring circuit after startup.

2. A safety securing device according to claim 1, wherein:

said rotation stop monitoring circuit includes and AND circuit;

said speed judgement circuit, to which said detection signal output from said rotation detecting means is provided, continuously generates a high level output signal when intervals between changes in said detection signal become longer than a specific period of time;

said level detection circuit, to which said detection signal output from said rotation detecting means is provided, generates a high level output signal when said detection signal is at or higher than a specific level; and;

said AND circuit, to which said output signal from said speed judgement circuit and said output signal from said level detection circuit are provided, generates an output signal constituted of an AND calculation of said output signals.

3. A safety security device comprising:

a rotation detecting means detecting rotation of a mechanical movable portion and outputting a detection signal corresponding to a rotation rate thereof;

a rotation monitoring circuit, to which said detection signal from said rotation detecting means is provided, outputting a rotation-existing signal when said detection signal indicates that said mechanical movable portion is rotating;

a rotation stop monitoring circuit, including a speed judgment circuit and a level detection circuit, to which said detection signal from said rotation detecting means is provided, outputting a rotation-stop signal when said detection signal indicates a rotation rate lower than a predetermined rotation rate;

a movable portion control circuit using said rotation-existing signal, said rotation-stop signal and an external command signal for input signals to control said mechanical movable portion with logic thereof;

said mechanical movable portion being enclosed by a fence and a door provided at a portion of said fence, and;

said door including a locking device, with said locking device being not allowed to be released while said mechanical movable portion is rotating and being allowed to be released when an indication is made that said rotation rate of said mechanical movable portion is lower than said predetermined rotation rate that has been pre-set at said rotation stop monitoring circuit;

wherein said movable portion control circuit performs OR calculation for said rotation-existing signal output from said rotation monitoring circuit and an output signal from a startup switch for starting said mechanical movable portion, and uses an AND output signal constituted of an OR output signal thereof and an ON signal output from a door switch when said door is closed for a signal for driving said mechanical movable portion.

4. A safety security device comprising:

a rotation detecting means detecting rotation of a mechanical movable portion and outputting a detection signal corresponding to a rotation rate thereof;

a rotation monitoring circuit, to which said detection signal from said rotation detecting means is provided, outputting a rotation-existing signal when said detection signal indicates that said mechanical movable portion is rotating;

a rotation stop monitoring circuit, including a speed judgment circuit and a level detection circuit, to which said detection signal from said rotation detecting means is provided, outputting a rotation-stop signal when said detection signal indicates a rotation rate lower than a predetermined rotation rate;

a movable portion control circuit using said rotation-existing signal, said rotation-stop signal and an external command signal for input signals to control said mechanical movable portion with logic thereof;

said mechanical movable portion being enclosed by a fence and a door provided at a portion of said fence, and;

said door including a locking device, with said locking device being not allowed to be released while said mechanical movable portion is rotating and being allowed to be released when an indication is made that said rotation rate of said mechanical movable portion is lower than said predetermined rotation rate that has been pre-set at said rotation stop monitoring circuit;

wherein said movable portion control circuit includes an operating switch, an on-delay timer, a self holding circuit and a means for switching; said operating switch is provided with at least a first contact point and a second contact point; said first contact point and said second contact point maintain a relationship whereby, when one is closed another is open, with said first contact point connected in series to a motor of said mechanical movable portion and said second contact point connected in series to said on-delay timer; said on-delay timer is provided with a contact point; said self holding circuit is provided with an OR signal constituted of an ON signal of said contact point of said on-delay timer and said rotation-existing signal as a trigger signal, and is provided with said rotation-stop signal from said rotation stop monitoring circuit to be used as a reset signal; and said means for switching provides a signal for releasing said locking device to said locking device when an output from said self holding circuit is received.

5. A safety security device comprising:

a rotation detecting means detecting rotation of a mechanical movable portion and outputting a detection signal corresponding to a rotation rate thereof;

a rotation monitoring circuit, to which said detection signal from said rotation detecting means is provided, outputting a rotation-existing signal when said detection signal indicates that said mechanical movable portion is rotating;

a rotation stop monitoring circuit, including a speed judgment circuit and a level detection circuit, to which said detection signal from said rotation detecting means is provided, outputting a rotation-stop signal when said detection signal indicates a rotation rate lower than a predetermined rotation rate;

a movable portion control circuit using said rotation-existing signal, said rotation-stop signal and an external command signal for input signals to control said mechanical movable portion with logic thereof;

said mechanical movable portion being enclosed by a fence and a door provided at a portion of said fence, and;

said door including a locking device, with said locking device being not allowed to be released while said mechanical movable portion is rotating and being allowed to be released when an indication is made that said rotation rate of said mechanical movable portion is lower than said predetermined rotation rate that has been pre-set at said rotation stop monitoring circuit;

wherein said movable portion control circuit includes an operating switch, a door switch and a means for switching; said operating switch outputs either a mechanical movable portion POWER ON signal or a mechanical movable portion POWER OFF signal; said door switch outputs an ON signal that indicates that said door is open, and; said means for switching is provided with an OR signal constituted of an AND signal of said mechanical movable portion POWER OFF signal from said operating switch and said on switch from said door switch and said rotation on switch to be used as a trigger input signal, and is provided with a LOCK signal for said locking device to be used as a reset input signal, to provide said locking device with said LOCK signal.

* * * * *